(12) United States Patent
Itoh

(10) Patent No.: US 7,500,537 B2
(45) Date of Patent: Mar. 10, 2009

(54) STEERING APPARATUS FOR VEHICLE

(75) Inventor: Koichi Itoh, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 379 days.

(21) Appl. No.: 11/206,944

(22) Filed: Aug. 19, 2005

(65) Prior Publication Data

US 2006/0042859 A1    Mar. 2, 2006

(30) Foreign Application Priority Data

Aug. 25, 2004  (JP) ............................ 2004-245824
Oct. 1, 2004    (JP) ............................ 2004-290603

(51) Int. Cl.
B62D 5/00    (2006.01)
(52) U.S. Cl. .................. 180/405; 180/402; 180/444
(58) Field of Classification Search ................ 180/402, 180/405, 407, 444; 701/41, 42, 43
See application file for complete search history.

(56) References Cited

U.S. PATENT DOCUMENTS

| | | | |
|---|---|---|---|
| 5,295,550 | A | 3/1994 | Chikuma |
| 6,394,218 | B1 | 5/2002 | Heitzer |
| 6,580,989 | B1 * | 6/2003 | Husain et al. ............... 701/41 |
| 6,612,393 | B2 * | 9/2003 | Bohner et al. .............. 180/405 |
| 7,004,279 | B2 * | 2/2006 | Shitamitsu et al. ......... 180/402 |
| 2002/0092696 | A1 | 7/2002 | Bohner et al. |
| 2005/0037884 | A1 | 2/2005 | Hermann et al. |
| 2005/0071061 | A1 * | 3/2005 | Kato et al. .................... 701/41 |
| 2005/0155809 | A1 * | 7/2005 | Krzesicki et al. ............ 180/407 |

FOREIGN PATENT DOCUMENTS

| | | |
|---|---|---|
| DE | 100 39 170 A1 | 6/2001 |
| DE | 101 01 827 A1 | 7/2002 |
| DE | 101 35 736 C1 | 4/2003 |
| DE | 101 60 717 A1 | 6/2003 |
| JP | U 4-67178 | 6/1992 |
| JP | A 07-149247 | 6/1995 |
| JP | A 2000-184774 | 6/2000 |
| JP | A 2001-301639 | 10/2001 |
| JP | A 2002-145098 | 5/2002 |
| JP | A 2003-182622 | 7/2003 |
| JP | A 2004-058743 | 2/2004 |
| JP | A 2004-210200 | 7/2004 |
| WO | WO 2004/065195 A1 | 8/2004 |

\* cited by examiner

*Primary Examiner*—Tony H. Winner
(74) *Attorney, Agent, or Firm*—Oliff & Berridge, PLC

(57) ABSTRACT

A steering apparatus for a vehicle is set to a steer-by-wire mode with an electromagnetic clutch being in a disconnected state. In response to steering operation applied to a steering wheel, first and second electric motors turn left and right front wheels. When a failure arises in one of first and second turning control systems including the first and second motors, the turning characteristic of the left and right front wheels is gradually changed from a turning characteristic for steer-by-wire to that for steer-by-mechanical connection. When a failure arises in the first and second turning control systems or after the turning characteristic is changed, the electromagnetic clutch is brought into a connected state, whereby the steering apparatus is switched to a steer-by-mechanical connection mode. Even when the steer-by-wire mode is switched to the steer-by-mechanical connection mode, a driver is not given an unnatural sensation, and excellent steering stability is maintained.

17 Claims, 15 Drawing Sheets

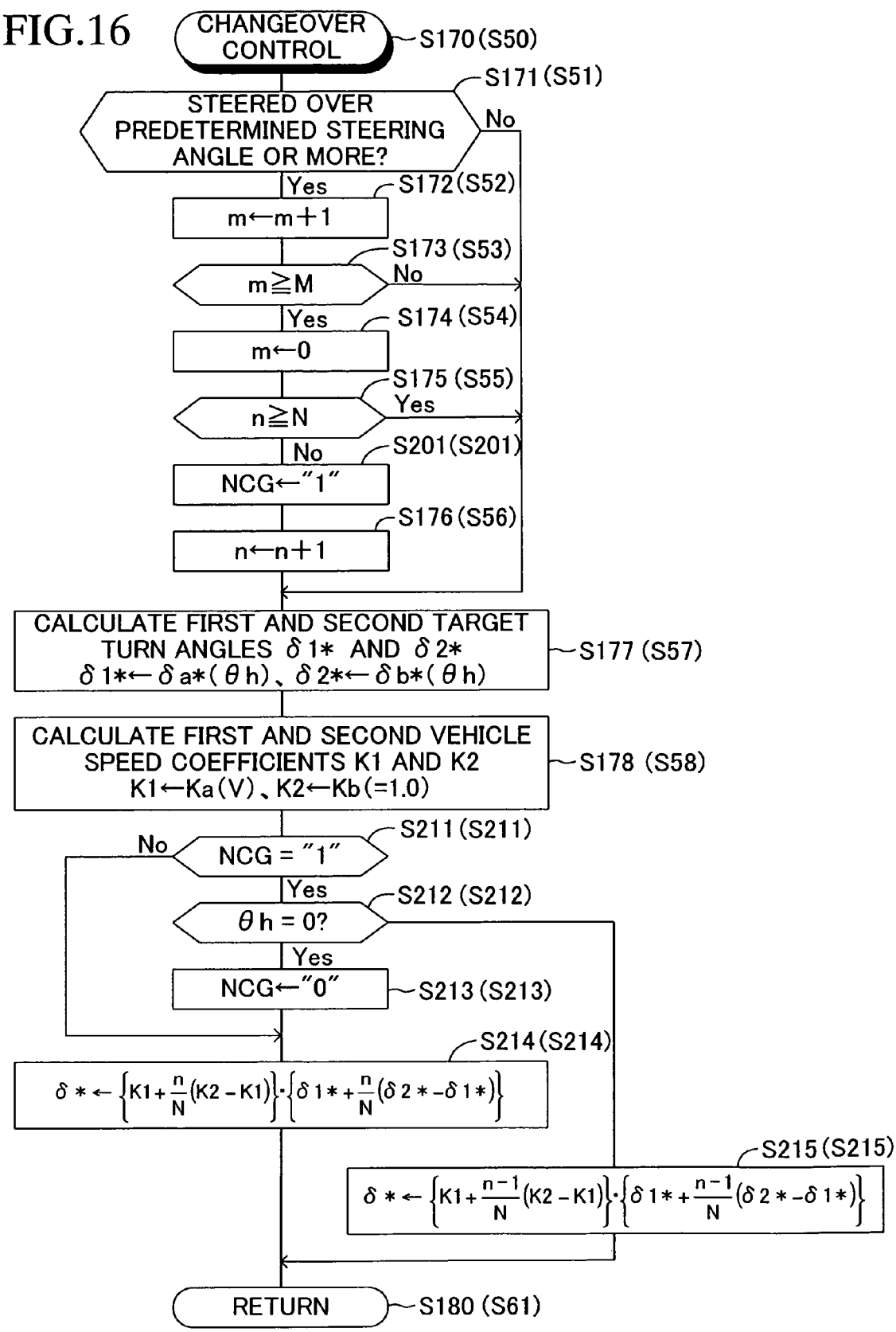

STEERING APPARATUS FOR VEHICLE

BACKGROUND OF THE INVENTION

1. Field of the Invention

The present invention relates to a steering apparatus for a vehicle which turns steerable wheels in accordance with steering operation imparted to a steering wheel by a driver.

2. Description of the Related Art

Conventionally, there has been known a steer-by-wire-type steering apparatus for a vehicle in which a steering wheel is mechanically separated from the steerable wheels of the vehicle, and when a driver applies a steering operation to the steering wheel, a turning actuator device provided on the steerable wheel side is electrically controlled so as to turn the steerable wheels in accordance with the steering operation applied to the steering wheel. As shown in, for example, Japanese Patent Application Laid-Open (kokai) No. 2002-145098, such a steering apparatus is designed so as to cope with possible cases where the turning actuator device fails to turn the steerable wheels. Specifically, a steering transmission mechanism for mechanically connecting the steering wheel and the steerable wheels is provided; and an electromagnetic clutch is interposed in the steering transmission mechanism so as to establish or break the mechanical connection. With the electromagnetic clutch maintained in a disengaged state or disconnected state, steering of the steerable wheels by means of the turning actuator device is enabled (steer-by-wire mode). When the turning actuator device becomes unable to steer the steerable wheels, the electromagnetic clutch is switched to an engaged state or connected state to thereby mechanically transmit the steering operation from the steering wheel to the steerable wheels, whereby the steerable wheels are turned in accordance with the steering operation applied to the steering wheel (steer-by-mechanical connection mode).

Further, in the steering apparatus disclosed in Japanese Patent Application Laid-Open No. 2002-145098, two turning actuators are provided. When one turning actuator becomes unable to steer the steerable wheels, the electromagnetic clutch is switched to a connected state, and simultaneously, operation of the other turning actuator is switched to assist the turning of the steerable wheels performed in accordance with the steering operation applied to the steering wheel.

However, in the conventional apparatus, the turning characteristic of the steerable wheels in relation to the steering operation in the steer-by-wire mode in which the steerable wheels are turned by means of the turning actuator differs from the turning characteristic of the steerable wheels in relation to the steering operation applied to the steering wheel in the steer-by-mechanical connection mode in which the steering wheel is mechanically connected to the steerable wheels via the steering transmission mechanism. For example, in the steer-by-wire mode, the turning characteristic is typically set such that a driver can steer the steerable wheels to a large angle without changing the positions of his hands on the steering wheel. Further, in the steer-by-wire mode, through utilization of the condition where the steering wheel is not mechanically connected to the steerable wheels, the turning characteristic is changed in accordance with vehicle speed so as to improve steering performance and traveling stability, which cannot be realized in the steer-by-mechanical connection mode. Therefore, in the case where the steer-by-wire mode is switched to the steer-by-mechanical connection mode when turning of the steerable wheels by means of the turning actuator becomes impossible, the change in the turning characteristic gives the driver an unnatural sensation, and the steering stability of the vehicle may deteriorate as a result of the driver's improper steering operation.

Moreover, Japanese Patent Application Laid-Open (kokai) No. 2001-301639 discloses a steer-by-wire-type steering apparatus for a vehicle in which a connection-disconnection apparatus composed of first arid second connection-disconnection units connected in series and each selectively switched between a disconnected state and a connected state is interposed in a steering transmission mechanism. However, this publication does not disclose a method of coping with anomaly of the connection-disconnection units.

SUMMARY OF THE INVENTION

In view of the foregoing problems, an object of the present invention is to provide a steering apparatus for a vehicle which is configured such that a driver is not given an unnatural sensation and in which excellent steering stability of the vehicle is maintained even when the operation mode is switched from the steer-by-wire mode to the steer-by-mechanical connection mode.

In order to achieve the above object, the present invention provides a steering apparatus for a vehicle, comprising: a steering transmission mechanism mechanically connecting a steering member to a steerable wheel of the vehicle, the steering transmission mechanism mechanically transmitting to the steerable wheel steering operation applied to the steering member, to thereby turn the steerable wheel in accordance with a predetermined first characteristic in relation to the steering operation applied to the steering member; a connection-disconnection device interposed in the steering transmission mechanism, the connection-disconnection device mechanically connecting the steering member to the steerable wheel when the connection-disconnection apparatus is in a connected state and breaking the mechanical connection when the connection-disconnection apparatus is in a disconnected state; a turning actuator device disposed in the steering transmission mechanism to be located between the connection-disconnection device and the steerable wheel, the turning actuator device turning the steerable wheel when the connection-disconnection apparatus is in a disconnected state; turning control means for controlling operation of the turning actuator device in accordance with the steering operation applied to the steering member so as to turn the steerable wheel in accordance with a predetermined second characteristic in relation to the steering operation applied to the steering member, the second characteristic differing from the first characteristic; failure detection means for detecting an anomaly of the connection-disconnection device or the turning actuator device; and turning characteristic changeover control means, operable when an anomaly of the connection-disconnection device or the turning actuator device is detected by the failure detection means, for controlling operation of the turning actuator device such that the turning characteristic of the steerable wheel in relation to the steering operation applied to the steering member gradually changes from the second characteristic to the first characteristic.

Preferably, the turning actuator device includes first and second turning actuators capable of operating independently of each other; the failure detection means detects an anomaly of the first and second turning actuators; and the turning characteristic changeover control means is configured such that when the failure detection means detects an anomaly in one of the first and second turning actuators, the turning characteristic changeover control means controls operation of the other turning actuator such that the turning characteristic of the steerable wheel in relation to the steering operation applied to the steering member gradually changes from the second characteristic to the first characteristic.

Alternatively, the connection-disconnection device includes first and second connection-disconnection units connected in series and each being selectively switched to a disconnected state or a connected state; the failure detection means detects an anomaly of the first and second connection-disconnection units; and the turning characteristic changeover control means is configured such that when the failure detection means detects an anomaly in which one of the first and second connection-disconnection units is an always-connected state, the turning characteristic changeover control means controls operation of the turning actuator device such that the turning characteristic of the steerable wheel in relation to the steering operation applied to the steering member gradually changes from the second characteristic to the first characteristic.

In this case, the turning characteristic changeover control means is preferably configured such that the turning characteristic of the steerable wheel in relation to the steering operation applied to the steering member is gradually changed with the steering operation applied to the steering member. More specifically, the rate of change in the turning characteristic of the steerable wheel in relation to the steering operation applied to the steering member is increased with the number of times the steering member is operated to a predetermined extent or more or with the time over which the steering member is operated to a predetermined extent or more. In addition, the rate of change in the turning characteristic of the steerable wheel in relation to the steering operation applied to the steering member is increased with the extent to which the steering member is operated. The turning characteristic changeover control means may be configured such that the turning characteristic of the steerable wheel in relation to the steering operation applied to the steering member is gradually changed with elapse of time. Moreover, the turning characteristic changeover control means may be configured such that the turning characteristic of the steerable wheel in relation to the steering operation applied to the steering member is gradually changed with the number of times an ignition switch is turned on. More specifically, the turning characteristic of the steerable wheel in relation to the steering operation applied to the steering member is changed every time the ignition switch is turned on or every time the ignition switch is turned on a predetermined number of times. The turning characteristic changeover control means is preferably configured to change the turning characteristic upon satisfaction of a condition that the steerable wheel has an identical turn angle before and after the turning characteristic is changed. Moreover, the turning characteristic changeover control means is preferably configured to change the turning characteristic upon satisfaction of a condition that the steering member is not operated.

By virtue of the above configuration, when an anomaly of the connection-disconnection device or the turning actuator device is detected, operation of the turning actuator is controlled such that the turning characteristic of the steerable wheel in relation to the steering operation applied to the steering member is gradually changed from the second characteristic to the first characteristic. Specifically, in the steering apparatus for a vehicle which includes two turning actuators, when an anomaly arises in one of the one of the first and second turning actuators, operation of the other turning actuator is controlled such that the turning characteristic of the steerable wheel in relation to the steering operation applied to the steering member gradually changes from the second characteristic to the first characteristic. Meanwhile, in the steering apparatus for a vehicle which includes two connection-disconnection units, when an anomaly of always being connected arises in one of the one of the first and second connection-disconnection units, the operation of the turning actuator device is controlled such that the turning characteristic of the steerable wheel in relation to the steering operation applied to the steering member gradually changes from the second characteristic to the first characteristic.

Accordingly, in the steering apparatus for a vehicle which includes two turning actuators, even in the case where after turning of the steerable wheel by one turning actuator becomes impossible, turning of the steerable wheel by the other turning actuator becomes impossible so that the connection-disconnection device is brought into a connected state, or the case where the connection-disconnection device is automatically brought into a connected state after control of the other turning actuator is effected by the turning characteristic changeover control means as will be described later, after turning of the steerable wheel by one turning actuator becomes impossible, the turning characteristic of the steerable wheel in relation to the steering operation applied to the steering member gradually changes from the second characteristic to the first characteristic, and finally becomes the first characteristic. Meanwhile, in the steering apparatus for a vehicle which includes two connection-disconnection units, even in the case where after an anomaly of always being connected arises in one of the connection-disconnection units, an anomaly of always being connected arises in the other connection-disconnection unit so that the steering member is mechanically connected to the steerable wheel, after the one connection-disconnection unit comes into an always-connected state, the turning characteristic of the steerable wheel in relation to the steering operation applied to the steering member gradually changes from the second characteristic to the first characteristic, and finally becomes the first characteristic. As a result, according to the present invention, even in the case where an anomaly arises in the connection-disconnection device or the turning actuator device and the steering member is mechanically connected to the steerable wheel via the steering transmission mechanism, the driver is becoming accustomed to the changing turning characteristic. As a result, the driver is not given an unnatural sensation from the change in the turning characteristic, and excellent steering stability of the vehicle is maintained. Further, the gradually changing turning characteristic expectedly provides an effect of enabling the driver to recognize an anomaly of the turning actuator.

According to another feature of the present invention, the steering apparatus for a vehicle which includes two turning actuators further comprises connection control means for bringing the connection-disconnection device into a connected state after control of the other of the first and second turning actuators is effected by the turning characteristic changeover control means. By virtue of this feature, before an anomaly arises in the other turning actuator attributable to harsh use of the other turning actuator, the steering member is automatically and mechanically connected to the steerable wheel via the steering transmission mechanism. Therefore, proper fail-safety of the vehicle is secured.

According to still another feature of the present invention, there is further provided assist control means for controlling operation of the other of the first and second turning actuators so as to assist turning of the steerable wheel in accordance with the steering operation applied to the steering member after the connection-disconnection device is brought into a connected state by means of the connection control means. By virtue of this feature, after the steering member is automatically and mechanically connected to the steerable wheel via the steering transmission mechanism, the steering operation applied to the steering member by a driver is assisted through operation of the other turning actuator. Therefore, the driver can operate the steering member lightly.

According to still another feature of the present invention, the steering apparatus for a vehicle which includes two connection-disconnection units further comprises travel restriction control means for restricting travel speed of the vehicle or disabling the vehicle from traveling when the failure detection means detects an anomaly in which one of the connection-disconnection units which is in an always-connected state. By virtue of this feature, travel of the vehicle is restricted before occurrence of an event in which an anomaly arises in the turning actuator device and steering of the steerable wheel becomes impossible. Therefore, traveling stability of the vehicle is secured.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 16 is a flowchart showing a changeover control routine according to another modification of the first and second embodiments.

DESCRIPTION OF THE PREFERRED EMBODIMENTS a. First Embodiment

Figure 1:
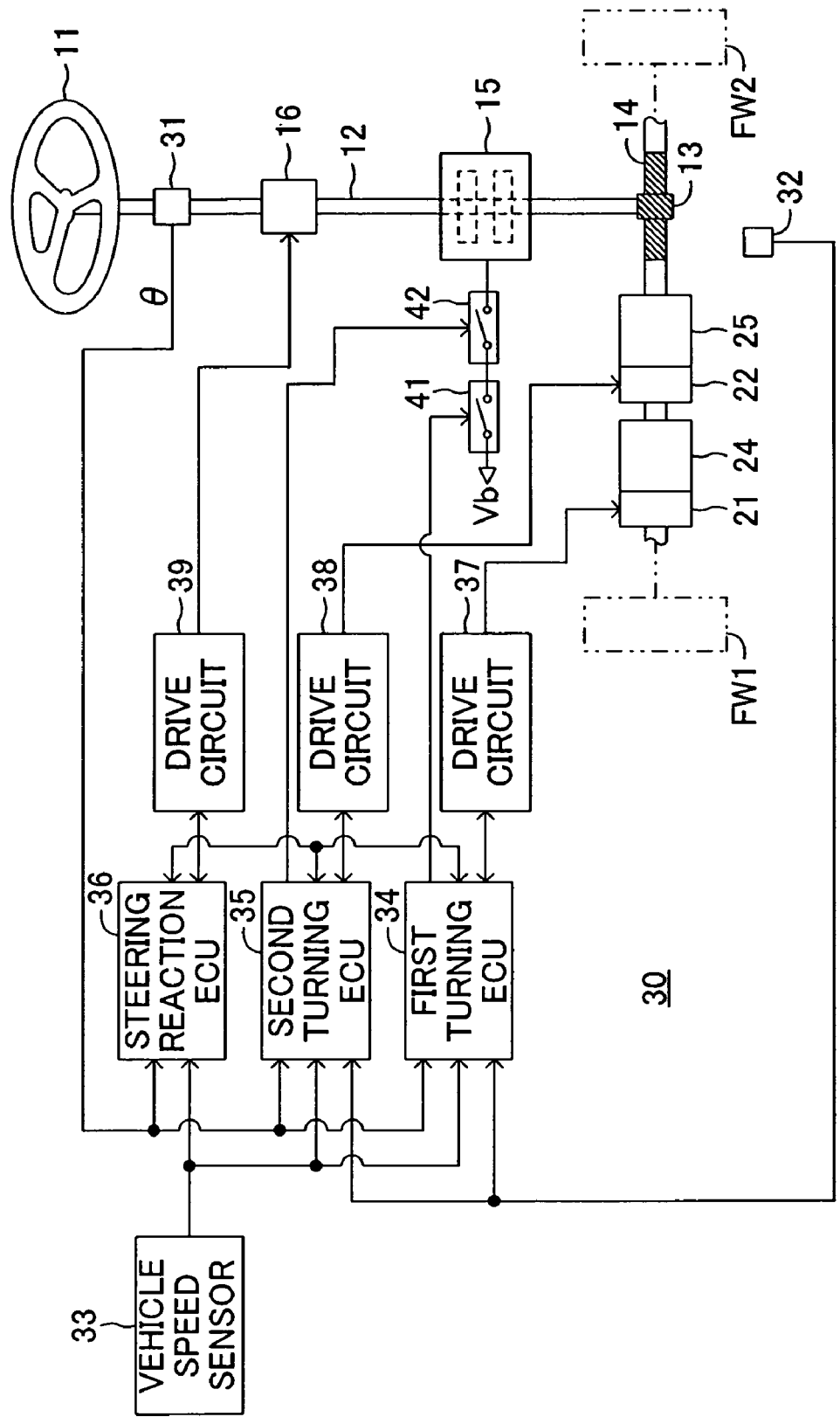
FIG. 1 is an overall schematic diagram of a steering apparatus for a vehicle according to a first embodiment of the present invention.

First, a first embodiment of the present invention will be described with reference to the drawings. FIG. 1 is an overall schematic diagram of a steering apparatus for a vehicle according to the first embodiment.

The steering apparatus includes a steering shaft 12 whose upper end is connected to a steering wheel 11 for unitary rotation therewith. A pinion gear 13 is connected to the lower end of the shaft 12 for unitary rotation therewith. The pinion gear 13 is in meshing engagement with rack teeth formed on a rack bar 14 to thereby form a rack-and-pinion mechanism. Left and right front wheels FW1 and FW2 are steerably connected to the opposite ends of the rack bar 14. Thus, the left and right front wheels FW1 and FW2 are steered leftward or rightward in accordance with axial displacement of the rack bar 14, which occurs as a result of rotation of the steering shaft 12 about its axis. The steering shaft 12, the pinion gear 13, the rack bar 14, and other relevant components constitute the steering transmission mechanism of the present invention.

An electromagnetic clutch 15, serving as a connection-disconnection device, is interposed in the steering shaft 12. When electricity is not supplied to the electromagnetic clutch 15, the electromagnetic clutch 15 is in a disconnected state, so that the steering shaft 12 is separated into an upper portion and a lower portion. When electricity is supplied to the electromagnetic clutch 15, the electromagnetic clutch 15 enters a connected state, so that the upper portion and the lower portion of the steering shaft 12 are mechanically connected together. Further, an electric motor 16 for steering reaction is assembled to the steering shaft 12 to be located between the electromagnetic clutch 15 and the steering wheel 11. This electric moor 16 imparts steering reaction to the steering operation applied to the steering wheel 11 in a state in which the electromagnetic clutch 15 is in the disconnected state. Electric motors 21 and 22, which serve as turning actuators, are assembled to the rack bar 14. Rotations of the electric motors 21 and 22 are reduced in speed and converted to linear motions of the rack bar 14 by means of screw feed mechanisms 24 and 25.

Next, an electric control apparatus 30 for controlling operations of the electromagnetic clutch 15 and the electric motors 16, 21, and 22 will be described. The electric control apparatus 30 includes a steering angle sensor 31, a turn angle sensor 32, and a vehicle speed sensor 33. The steering angle sensor 31 is assembled to the upper portion of the steering shaft 12 to be located between the steering wheel 11 and the electric motor 16, and detects rotational angle of the steering wheel 11 about the axis from its neutral position and outputs a signal indicative of steering wheel steering angle θ. The turn angle sensor 32 is assembled to an unillustrated housing that surrounds the rack bar 14, and detects axial displacement of the rack bar 14 from its neutral position and outputs a signal indicative of actual turn angle δ. Each of the steering wheel steering angle θ and the actual turn angle δ becomes zero at the neutral position, assumes a positive value when the angle is a clockwise or rightward angle, and assumes a negative value when the angle is a counterclockwise angle or a leftward angle. The vehicle speed sensor 33 detects vehicle speed V, and outputs a signal indicative of the vehicle speed V.

Further, the electric control apparatus 30 includes a first electronic control unit for turning control (hereinafter referred to as the "first turning ECU") 34, a second electronic control unit for turning control (hereinafter referred to as the "second turning ECU") 35, and an electronic control unit for steering reaction control (hereinafter referred to as the "steering reaction ECU") 36. The steering angle sensor 31, the turn angle sensor 32, and the vehicle speed sensor 33 are connected to the first turning ECU 34 and the second turning ECU 35. The steering angle sensor 31 and the vehicle speed sensor 33 are connected to the steering reaction ECU 36. Each of the ECUs 34 to 36 is mainly formed by a microcomputer composed of a CPU, ROM, RAM, etc.

Figure 2:
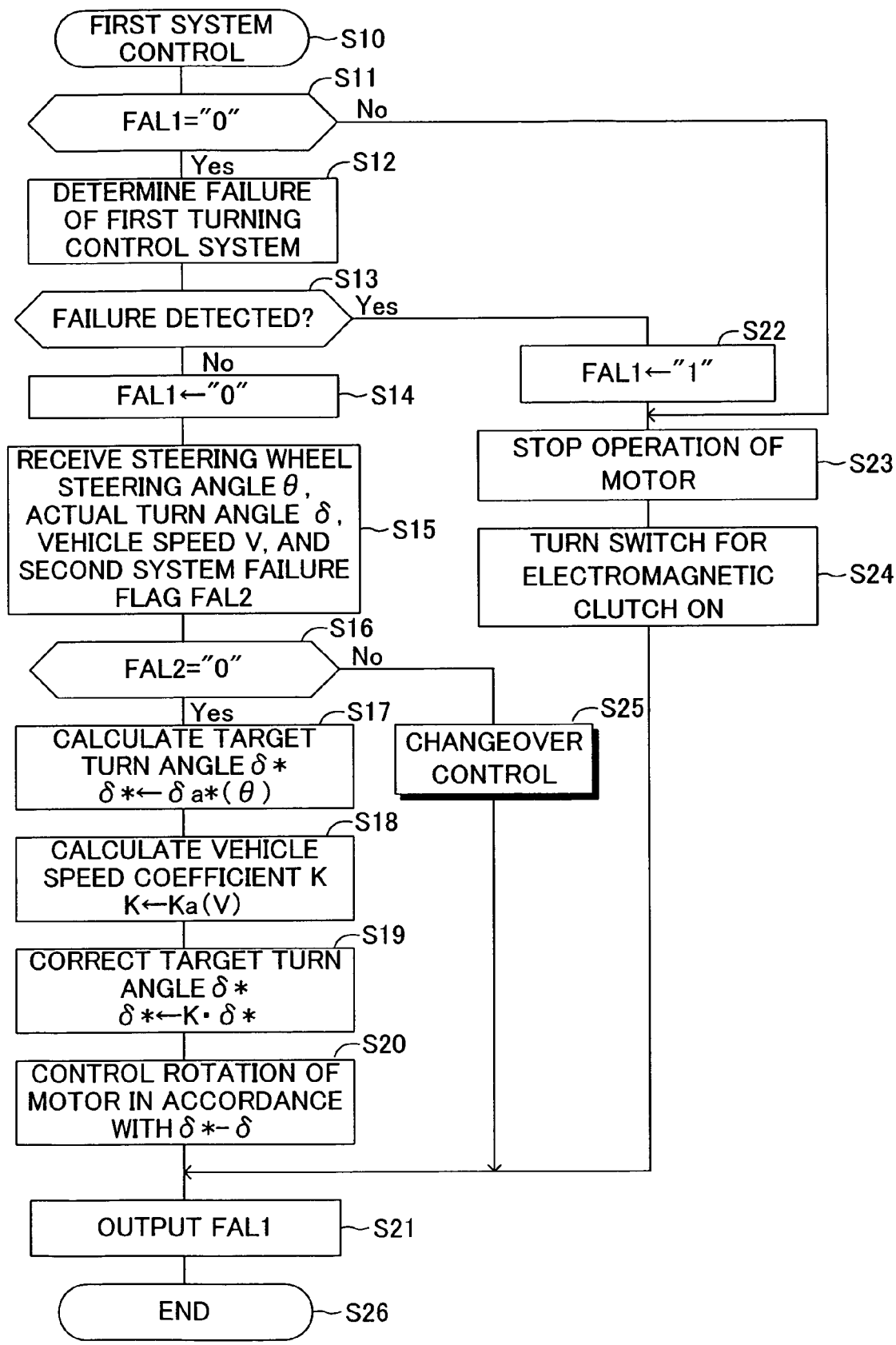
FIG. 2 is a flowchart showing a first system control program executed by a first turning ECU of FIG. 1.

The first turning ECU 34 controls operation of the electric motor 21 via a drive circuit 37 and controls a switch circuit 41 through repeated execution of a first system control program of FIG. 2 (including a changeover control routine of FIG. 4) at predetermined short intervals. The second turning ECU 35 controls operation of the electric motor 22 via a drive circuit 38 and controls a switch circuit 42 through repeated execution of a second system control program of FIG. 3 (including the changeover control routine of FIG. 4) at predetermined short intervals. The steering reaction ECU 36 controls operation of the electric motor 16 via a drive circuit 39 through repeated execution of an unillustrated steering reaction control program. The ECUs 34 to 36 control the drive circuits 37 to 39, respectively, so as to drive and control the electric motors 21, 22, and 16. The switch circuits 41 and 42 are connected in series between an unillustrated power supply circuit and the electromagnetic clutch 15 so as to control supply of electricity from the power supply circuit to the electromagnetic clutch 15.

Next, operation of the first embodiment having the above-described configuration will be described. When an ignition switch is turned on, the first and second turning ECUs 34 and 35 start to repeatedly execute the first and second system control programs, respectively, at predetermined short intervals. Further, the steering reaction ECU 36 starts to repeatedly execute the unillustrated steering reaction control program at predetermined short intervals.

The first turning ECU 34 starts execution of the first system control program from step S10 of FIG. 2, and proceeds to step S11 so as to determine whether the value of a first failure flag FAL1 is "0." The value "0" of the first failure flag FAL1 represents that the first turning control system, including the electric motor 21 and the drive circuit 37, can turn the left and right front wheels FW1 and FW2, and the value "1" of the first failure flag FAL1 represents that the first turning control system cannot turn the left and right front wheels FW1 and FW2 (i.e., the first turning control system is in a failed condition). The first failure flag FAL1 is stored and held in a nonvolatile memory area when the first turning ECU 34 does not operate, whereby the value of the first failure flag FAL1 is maintained even when the ignition switch is turned off.

First, the case where the value of the first failure flag FAL1 is "0" will be described. In this case, the first turning ECU 34 makes a "Yes" determination in step S11, and then proceeds to step S12 so as to detect any failure of the first turning control system. Specifically, the first turning ECU 34 receives from the drive circuit 37 signals indicating wire breakage, short circuit, or other anomalies of the electric motor 21, to thereby detect any anomaly of the first turning control system, including the electric motor 21 and the drive circuit 37. Next, the first turning ECU 34 proceeds to step S13 so as to determine whether a failure has been detected by the processing of step S12. Here, the description will be continued under the assumption that no failure has been detected by the processing of steps S12 and S13. In this case, after making a "No" determination in step S13, the first turning ECU 34 sets the first failure flag FAL1 to "0" in step S14, and then performs the processing of step S15 and steps subsequent thereto.

Notably, in the state in which the value of the first failure flag FAL1 is "0"; i.e., in a state in which no failure has arisen in the first turning control system, the switch circuit 41 is in an initially set state; i.e., an off state, so that no electricity is supplied to the electromagnetic clutch 15. Therefore, the electromagnetic clutch 15 is in the disconnected state, and the upper portion and the lower portion of the steering shaft 12 are separated from each other.

In step S15, the first turning ECU 34 acquires the steering wheel steering angle θ, the actual turn angle δ, and the vehicle speed V from the steering angle sensor 31, the turn angle sensor 32, and the vehicle speed sensor 33, respectively, as well as the value of a second failure flag FAL2 which is output from the second turning ECU 35 as described later. Next, in step S16, the first turning ECU 34 determines whether the acquired value of the second failure flag FAL2 is "0." The value "0" of the second failure flag FAL2 represents that the second turning control system, including the electric motor 22 and the drive circuit 38, can turn the left and right front wheels FW1 and FW2, and the value "1" of the second failure flag FAL2 represents that the second turning control system cannot turn the left and right front wheels FW1 and FW2 (i.e., the second turning control system is in a failed condition). The second failure flag FAL2 is also stored and held in a nonvolatile memory area when the second turning ECU 35 does not operate, whereby the value of the second failure flag FAL2 is maintained even when the ignition switch is turned off. Here, the description will be continued under the assumption that a failure has not arisen in the second turning control system and the value of the second failure flag FAL2 is "0."

Accordingly, the first turning ECU 34 makes a "Yes" determination in step S16, and performs the processing of step S17 and steps subsequent thereto. In step S17, the first turning ECU 34 calculates a target turn angle δa* for steer-by-wire, which changes in accordance with the steering wheel steering angle θ, with reference to a first turn angle table stored in the ROM, and stores, as a target turn angle δ*, the calculated target turn angle δa* for steer-by-wire. As indicated by a solid line in FIG. 5, the first turn angle table defines the target turn angle δa* for steer-by-wire, which increases nonlinearly with the steering wheel steering angle θ. The rate of change in the target turn angle δa* for steer-by-wire to the steering wheel steering angle θ is set to be small in a range in which the absolute value |θ| of the steering wheel steering angle θ is small, and increase with the absolute value |θ| of the steering wheel steering angle θ. Notably, instead of using the first turn angle table, a previously prepared function which represents the relation between the steering wheel steering angle θ and the target turn angle δa* for steer-by-wire may be used so as to calculate the target turn angle δa* for steer-by-wire.

Figure 6:
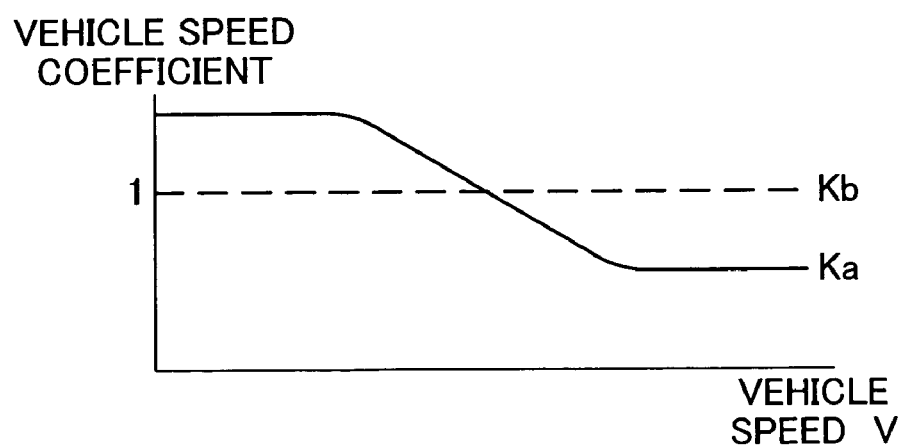
FIG. 6 is a graph showing the relation between vehicle speed and vehicle speed coefficient.

Next, in step S18, the first turning ECU 34 calculates a vehicle speed coefficient Ka for steer-by-wire, which changes in accordance with the vehicle speed V, with reference to a vehicle speed coefficient table stored in the ROM, and stores, as a vehicle speed coefficient K, the calculated vehicle speed coefficient Ka for steer-by-wire. As indicated by a solid line in FIG. 6, the vehicle speed coefficient table defines the vehicle speed coefficient Ka for steer-by-wire, which decreases non-linearly as the vehicle speed V increases such that the vehicle speed coefficient Ka assumes a value greater than 1 in a range in which the vehicle speed is low and assumes a value less than 1 in a range in which the vehicle speed V is high. Notably, instead of using the vehicle speed coefficient table, a previously prepared function which represents the relation between the vehicle speed V and the vehicle speed coefficient Ka for steer-by-wire may be used so as to calculate the vehicle speed coefficient Ka for steer-by-wire.

After having determined the target turn angle δ* and the vehicle speed coefficient K, in step S19, the first turning ECU 34 corrects the target turn angle δ* with the vehicle speed coefficient K through performance of calculation in accordance with the following Eq. 1, to thereby obtain a final target turn angle δ*.

$$\delta^* = K \cdot \delta^* \quad \text{Eq. 1}$$

In step S20, the first turning ECU 34 controls rotation of the electric motor 21 via the drive circuit 37 in accordance with the difference (δ*−δ) between the final target turn angle δ* and the actual turn angle δ so that the actual turn angle δ becomes equal to the final target turn angle δ*. As a result, the electric motor 21 is driven to rotate so as to axially move the rack bar 14 via the screw feed mechanism 24, to thereby turn the left and right front wheels FW1 and FW2 to the target turn angle δ*.

Figure 5:
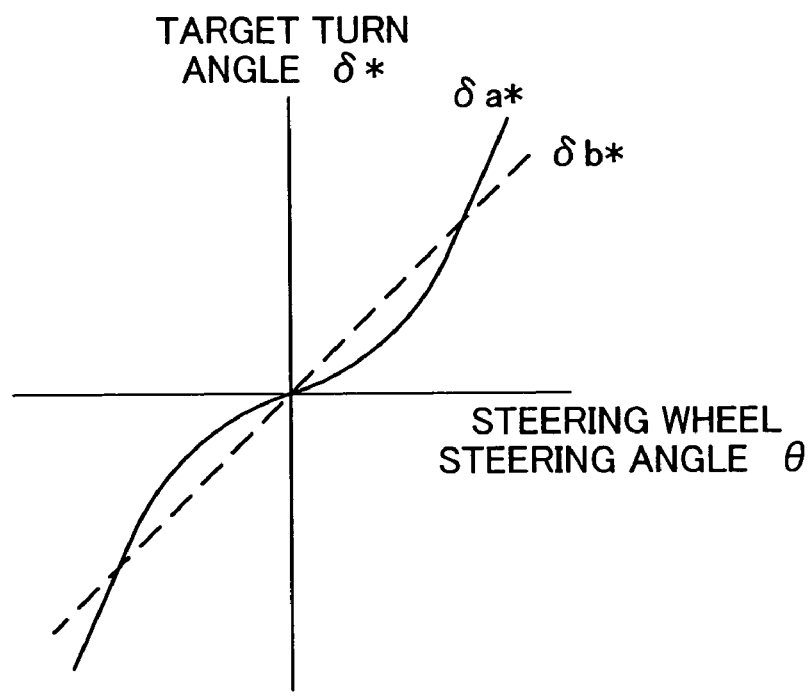
FIG. 5 is a graph showing the relation between steering wheel steering angle and target turn angle.

With the above turning control, as indicated by the solid line of FIG. 5, the left and right front wheels FW1 and FW2 are turned to a small extent with respect to change in the steering wheel steering angle θ in the range in which the steering angle θ is small, and are turned to a large extent with respect to change in the steering wheel steering angle θ in the range in which the steering angle θ is large. As a result, the driver can turn the left and right front wheels FW1 and FW2 to a large turn angle without changing the positions of his hands on the steering wheel. Further, as indicated by the solid line of FIG. 6, the left and right front wheels FW1 and FW2 are turned to a large extent in relation to the steering wheel steering angle θ when the vehicle speed V is low, and are turned to a small extent in relation to the steering wheel steering angle θ when the vehicle speed V increases. After the processing of step S20, in step S21, the first turning ECU 34 outputs the value of the first failure flag FAL1 to the second turning ECU 35. After that, in step S26, the first turning ECU 34 ends the first system control program.

Figure 3:
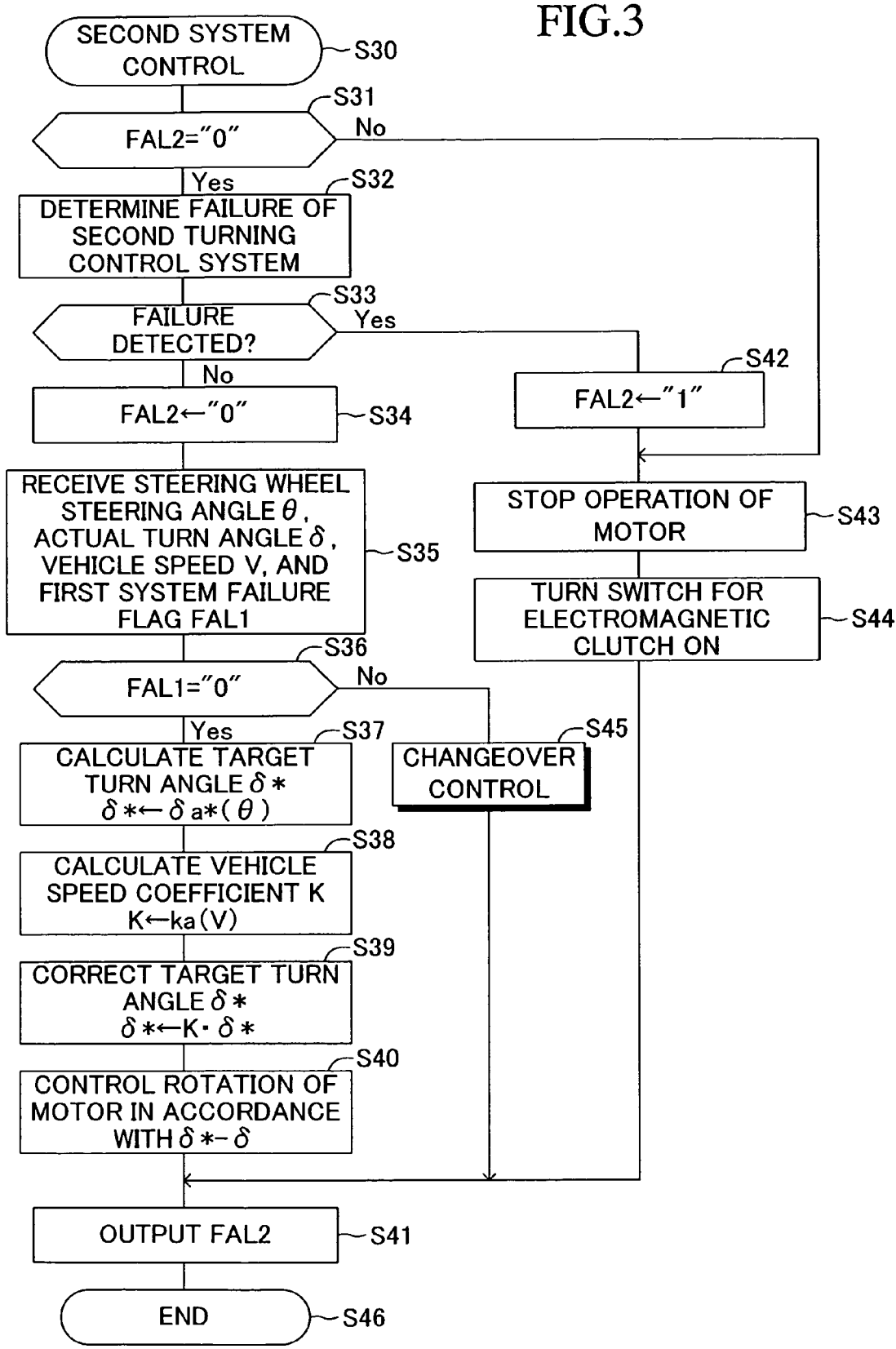
FIG. 3 is a flowchart showing a second system control program executed by a second turning ECU of FIG. 1.

Meanwhile, in parallel with the execution of the first system control program, the second turning ECU 35 executes a second system control program shown in FIG. 3 at predetermined short intervals. This second system control program is configured in the same manner as the first system control program, and steps S31 to S41 correspond to the previously described steps S11 to S21, respectively. Further, the previously described first turn angle table (see the solid line of FIG. 5) and the vehicle speed coefficient table (see the solid line of FIG. 6) are also stored in the second turning ECU 35.

In the processing of steps S31 to S41, the second turning ECU 35 receives from the drive circuit 38 signals indicating wire breakage, short circuit, or any other anomalies of the electric motor 22, to thereby determine an anomaly of the second turning control system, including the electric motor 22 and the drive circuit 38. Subsequently, through the processing of steps S33 and S34, the second turning ECU 35 sets the second failure flag FAL2 to "0." Further, through the processing of steps S35 to S40, the second turning ECU 35 turns the left and right front wheels FW1 and FW2 to the target turn angle δ* in cooperation with the drive circuit 38, upon satisfaction of the conditions that no failure has arisen in the first turning control system and the value of the first failure flag FAL1 is "0." Notably, when the value of the second failure flag FAL2 is "0," the switch circuit 42 is still in the initially set state; i.e., the off state, as in the case of the switch circuit 41. Therefore, the left and right front wheels FW1 and FW2 are turned by both the first and second turning control systems. In step S41, the second turning ECU 35 outputs the value of the second failure flag FAL2 to the first turning ECU 34.

Further, in the above-described case in which the electromagnetic clutch 15 is in the disconnected state, through execution of an unillustrated program, the steering reaction ECU 36 controls operation of the electric motor 16 for steering reaction via the drive circuit 39 in accordance with the steering wheel steering angle θ and the vehicle speed V. Therefore, in this state, the drive force produced by the electric motor 16 is imparted, as steering reaction, to the turning operation applied to the steering wheel 11. As a result, the driver can turn the steering wheel 11 while sensing a proper steering reaction.

Next, the case in which a failure has arisen in one of the first and second turning control systems; e.g., in the second turning control system, will be described. In this case, the second turning ECU 35 makes a "Yes" determination in step S33 of FIG. 3, and then proceeds to step S42 so as to set the value of the second failure flag FAL2 to "1." Subsequently, in step S43, the second turning ECU 35 stops controlling the operation of the electric motor 22 to thereby stop the electric motor 22. After that, in step S44, the second turning ECU 35 switches the switch circuit 42 to an on state. After the processing of step S44, in step S41, the second turning ECU 35 outputs to the first turning ECU 34 the value of the second failure flag FAL2 having been set to "1." In step S46, the second turning ECU 35 ends the current execution of the second system control program.

When at a later time the second system control program is executed again, the second turning ECU 35 makes a "No" determination in step S31; i.e., determines that the value of the second failure flag FAL2 is not "0," performs the processing of the previously described steps S43, S44, and S41, and ends the execution of the second system control program in step S46. In the case where the second turning ECU 35 executes the second system control program in response to the ignition switch being turned on again after stoppage of the vehicle, the second failure flag FAL2 has been set to "1." Thus, the processing of steps S43, S44, and S41 is performed in such the case as well. Therefore, after that point in time, the left and right front wheels FW1 and FW2 are turned by means of only the first turning control system, and the switch circuit 42 is maintained in the on state.

Meanwhile, according to the first control program of FIG. 2, the first turning ECU 34 acquires the value of the second failure flag FAL2, which has been set to "1," through the processing of step S15. Subsequently, in step S16, the first turning ECU 34 makes a "No" determination, and starts to execute the changeover control routine of step S25.

Figure 4:
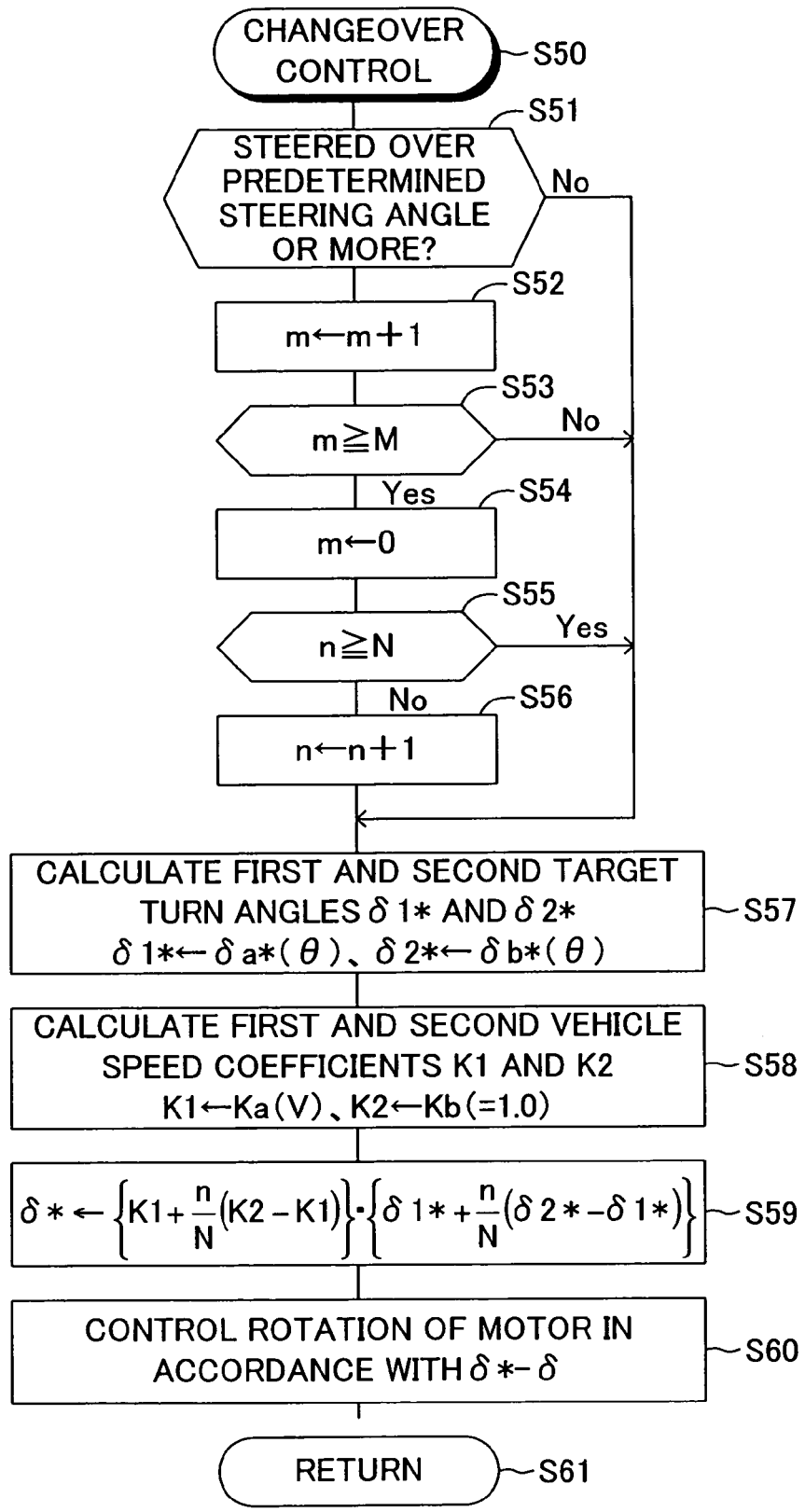
FIG. 4 is a flowchart showing the details of the changeover control routine of FIGS. 2 and 3.

As shown in detail in FIG. 4, the changeover control routine is started from step S50. In step S51, the first turning ECU 34 determines whether the steering wheel 11 has been steered over a predetermined steering angle or more; i.e., whether the absolute value |θ| of the steering wheel steering angle θ has changed from a value smaller than a predetermined value to a value equal to or greater than the predetermined value. More specifically, the first turning ECU 34 determines whether the absolute value |θ| of the steering wheel steering angle θ at the time of previous execution of the changeover control routine is smaller than the predetermined value, and the absolute value |θ| of the steering wheel steering angle θ at the time of present execution of the changeover control routine is equal to or greater than the predetermined value. Upon satisfaction of this condition, the first turning ECU 34 makes a "Yes" determination in step S51, and, after performance of the processing of steps S52 to S56, proceeds to step S57 and steps subsequent thereto. Meanwhile, when the above-described condition is not satisfied, the first turning ECU 34 makes a "No" determination in step S51, and proceeds directly to step S57 and steps subsequent thereto.

After incrementing a variable m by 1 in step S52, the first turning ECU 34 proceeds to step S53 so as to determine whether the variable m is equal to or greater than a predetermined value M. The variable m is used to count steering operation in which the steering wheel 11 is steered over a predetermined steering angle or more, and is initially set to zero. The predetermined value M defines the speed of updating of the later-described turning characteristic of the left and right front wheels FW1 and FW2 in relation to the steering wheel steering angle θ, and is set to a predetermined positive integer. When the variable m is less than the predetermined value M, the first turning ECU 34 makes a "No" determination in step S53, and proceeds to step S57. When the variable m is equal to or greater than the predetermined value M, the first turning ECU 34 makes a "Yes" determination in step S53, and proceeds to step S54 so as to set the variable m to zero (initial value). Subsequently, in step S55, the first turning ECU 34 determines whether a variable n is equal to or greater than a predetermined value N. The variable n is used to change the turning characteristic of the left and right front wheels FW1 and FW2 in relation to the steering wheel steering angle θ, and is initially set to 1. The predetermined value N defines the extent of change of the turning characteristic of the left and right front wheels FW1 and FW2 in relation to the steering wheel steering angle θ, and is set to a predetermined positive integer.

When the variable n is equal to or greater than the predetermined value N, the first turning ECU 34 makes a "Yes" determination in step S55, and proceeds to step S57. When the variable n is less than the predetermined value N, the first turning ECU 34 makes a "No" determination in step S55, proceeds to step S56 so as to increment the variable n by 1, and then proceeds to step S57. By virtue of the processing of these steps S51 to S56, until the variable n reaches the predetermined value N, the variable n is incremented by one every time the number of times the steering wheel 11 has been steered over the predetermined steering angle or more reaches M. Notably, when the predetermined value M is set to 1, the variable n is incremented by one every time the steering wheel 11 is steered over the predetermined steering angle or more.

In step S57, similar to the processing of the previously described step S17, the first turning ECU 34 calculates a target turn angle δa* for steer-by-wire, which changes in accordance with the steering wheel steering angle θ, with reference to the first turn angle table stored in the ROM, and stores, as a first target turn angle δ1*, the calculated target turn angle δa* for steer-by-wire. Further, in step S57, the first turning ECU 34 calculates a target turn angle δb* for steer-by-mechanical connection, which changes in accordance with the steering wheel steering angle θ, with reference to a second turn angle table stored in the ROM, and stores, as a second target turn angle δ2*, the calculated target turn angle δb* for steer-by-mechanical connection. As indicated by a broken line in FIG. 5, the second turn angle table defines the target turn angle δb* for steer-by-mechanical connection, which increases linearly with the steering wheel steering angle θ. Notably, instead of using the second turn angle table, a previously prepared function which represents the relation between the steering wheel steering angle θ and the target turn angle δb* for steer-by-mechanical connection may be used so as to calculate the target turn angle δb* for steer-by-mechanical connection.

Next, in step S58, similar to the processing of the previously described step S18, the first turning ECU 34 calculates a vehicle speed coefficient Ka for steer-by-wire, which changes in accordance with the vehicle speed V, with reference to a vehicle speed coefficient table stored in the ROM, and stores, as a first vehicle speed coefficient K1, the calculated vehicle speed coefficient Ka for steer-by-wire. Further, in step S58, the first turning ECU 34 stores a constant Kb as a second vehicle speed coefficient K2. As indicated by a broken line in FIG. 6, the constant Kb is set to 1.0.

After having determined the first and second target turn angles δ1* and δ2*, as well as the first and second vehicle speed coefficients K1 and K2, in step S59, the first turning ECU 34 calculates a final target turn angle δ* through performance of calculation in accordance with the following Eq. 2.

$$\delta^* = \{K1 + n \cdot (K2 - K1)/N\} \cdot \{\delta1^* + n \cdot (\delta2^* - \delta1^*)/N\} \qquad \text{Eq. 2}$$

Through performance of calculation in accordance with Eq. 2, the target turn angle δ* is calculated such that the target turn angle δ* gradually changes from the first target turn angle δ1* to the second target turn angle δ2* as the variable n changes from 1 to the predetermined value N.

In step S60, similar to the processing of the previously described step S20, the first turning ECU 34 controls rotation of the electric motor 21 via the drive circuit 37 in accordance with the difference (δ*−δ) between the target turn angle δ* and the actual turn angle δ so that the actual turn angle δ becomes equal to the target turn angle δ*. As a result, the left and right front wheels FW1 and FW2 are turned to the target turn angle δ*. In this case, as described above, the variable n increases from 1 to the predetermined value N with the number of times the steering wheel 11 has been steered over the predetermined steering angle or more, and the target turn angle δ* gradually changes from the first target turn angle δ1* to the second target turn angle δ2* as the variable n changes from 1 to the predetermined value N. Therefore, when a failure arises in the second turning control system, the left and right front wheels FW1 and FW2 are gradually turned, by means of the first control system, from the first target turn angle δ1* for steer-by-wire to the second target turn angle δ2* for steer-by-mechanical connection.

When the load of the first turning control system increases as a result of such turning control and a failure arises in the first turning control system, the first turning ECU 34 makes a "Yes" determination in step S13, and proceeds to step S22 so as to set the first failure flag FAL1 to "1" and then to step S23 so as to stop controlling the operation of the electric motor 21, to thereby stop the electric motor 21. After that, in step S24, the first turning ECU 34 switches the switch circuit 41 to an on state. After the processing of step S24, in step S21, the first turning ECU 34 outputs to the second turning ECU 35 the value of the first failure flag FAL1 having been set to "1." Subsequently, in step S26, the first turning ECU 34 ends the current execution of the first system control program.

When the first system control program is again executed later on, the first turning ECU 34 makes a "No" determination is step S11; i.e., determines that the value of the first failure flag FAL1 is not "0," performs the processing of the previously described steps S23, S24, and S21, and ends the execution of the first system control program in step S26. In the case where the first turning ECU 34 executes the first system control program in response to the ignition switch being turned on again after stoppage of the vehicle, the first failure flag FAL1 is "1." Thus, the processing of steps S23, S24, and S21 is performed in such a case as well. Therefore, after that point in time, the left and right front wheels FW1 and FW2 are not turned by means of the first and second turning control systems, and the switch circuit 41 is maintained in the on state.

Since both the switch circuits 41 and 42 are brought into the on state, electricity is supplied to the electromagnetic clutch 15 so that the electromagnetic clutch 15 is brought into a connected state. Thus, the upper portion and lower portion of the steering shaft 12 are mechanically connected together, whereby turning operation applied to the steering wheel 11 is mechanically transmitted via the steering shaft 12 to the pinion gear 13 and the rack bar 14. As a result, the left and right front wheels FW1 and FW2 are mechanically steered in response to the turning operation applied to the steering wheel 11, and the turn angle δ of the left and right front wheels FW1 and FW2 changes linearly with the steering wheel steering angle θ.

The characteristic of change in the turn angle δ of the left and right front wheels FW1 and FW2 with the steering wheel steering angle θ; i.e., the turning characteristic of the left and right front wheels FW1 and FW2 in relation to the steering operation applied to the steering wheel 11, is the same as that indicated by the broken line in FIG. 5. Accordingly, even when the electromagnetic clutch 15 is switched from a disconnected state to a connected state in response to a failure of the first and second turning control systems, whereby the mode of steering the left and right front wheels FW1 and FW2 is switched from the steer-by-wire mode to the steer-by-mechanical connection mode, the turning characteristic of the left and right front wheels FW1 and FW2 in relation to the steering operation applied to the steering wheel 11 does not change, so that the driver is not given an unnatural sensation. Further, since the turning characteristic is gradually changed from that of the steer-by-wire mode to that of the steer-by-mechanical connection mode after a failure arises in the second turning control system, the driver is becoming accustomed to the changing turning characteristic. As a result, the driver is not given an unnatural sensation from the change in the turning characteristic, and excellent steering stability of the vehicle is maintained. Further, the gradually changing turning characteristic expectedly provides an effect of enabling the driver to recognize an anomaly of the turning actuator.

Further, at this time, the steering reaction ECU 36 stops controlling the operation of the electric motor 16 for steering reaction to thereby stop the imparting of reaction by means of the electric motor 16. Notably, instead of causing the electric motor 16 to stop the imparting of reaction, the operation of the electric motor 16 may be controlled through execution of an unillustrated program such that the electric motor 16 assists the turning of the left and right front wheels FW1 and FW2 that is effected by the turning operation imparted to the steering wheel 11.

Meanwhile, in the case were a failure has arisen in the first turning control system, the first turning ECU 34 makes a "Yes" determination in step S13 of FIG. 2. Then, though the processing of steps S22 and S21, the first turning ECU 34 sets the first failure flag FAL1 to "1", and outputs the same to the second turning ECU 35. Further, through the processing of step S23, the first turning ECU 34 stops the turning of the left and right front wheels FW1 and FW2 by means of the electric motor 21. Moreover, through the processing of step S24, the first turning ECU 34 brings the switch circuit 41 for the electromagnetic clutch 15 into an on state.

Meanwhile, through the processing of steps S35 and S36, the second turning ECU 35 starts the execution of the changeover control routine of step S45. This changeover control routine that the second turning ECU 35 executes is identical to the changeover control routine of FIG. 4 that the first turning ECU 34 executes, except that the former changeover control routine controls the operation of the electric motor 22. Therefore, the left and right front wheels FW1 and FW2 are turned to the target turn angle by means of the second turning ECU 35, the target turn angle gradually changing from the first target turn angle δ1* for steer-by-wire to the second target turn angle δ2* for steer-by-mechanical connection.

When the load of the second turning control system increases as a result of such turning control of the second turning ECU 35 and a failure arises in the second turning control system, the second turning ECU 35 makes a "Yes" determination in step S33, and stops the operation of the electric motor 22 by the processing of step S43. Further, the second turning ECU 35 switches the switch circuit 42 to an on state by the processing of step S44. Accordingly, in this case as well, the electromagnetic clutch 15 is switched from a disconnected state to a connected state because of failures of the first and second turning control systems, whereby the mode of steering the left and right front wheels FW1 and FW2 is switched from the steer-by-wire mode to the steer-by-mechanical connection mode. By virtue of the above-described operation, in the case where a failure arises earlier in the first turning control system than in the second turning control system as well, there is expected an effect similar to that in the above-described case where a failure arises earlier in the second turning control system than in the first turning control system.

a1. Modification of the First Embodiment

Figure 7:
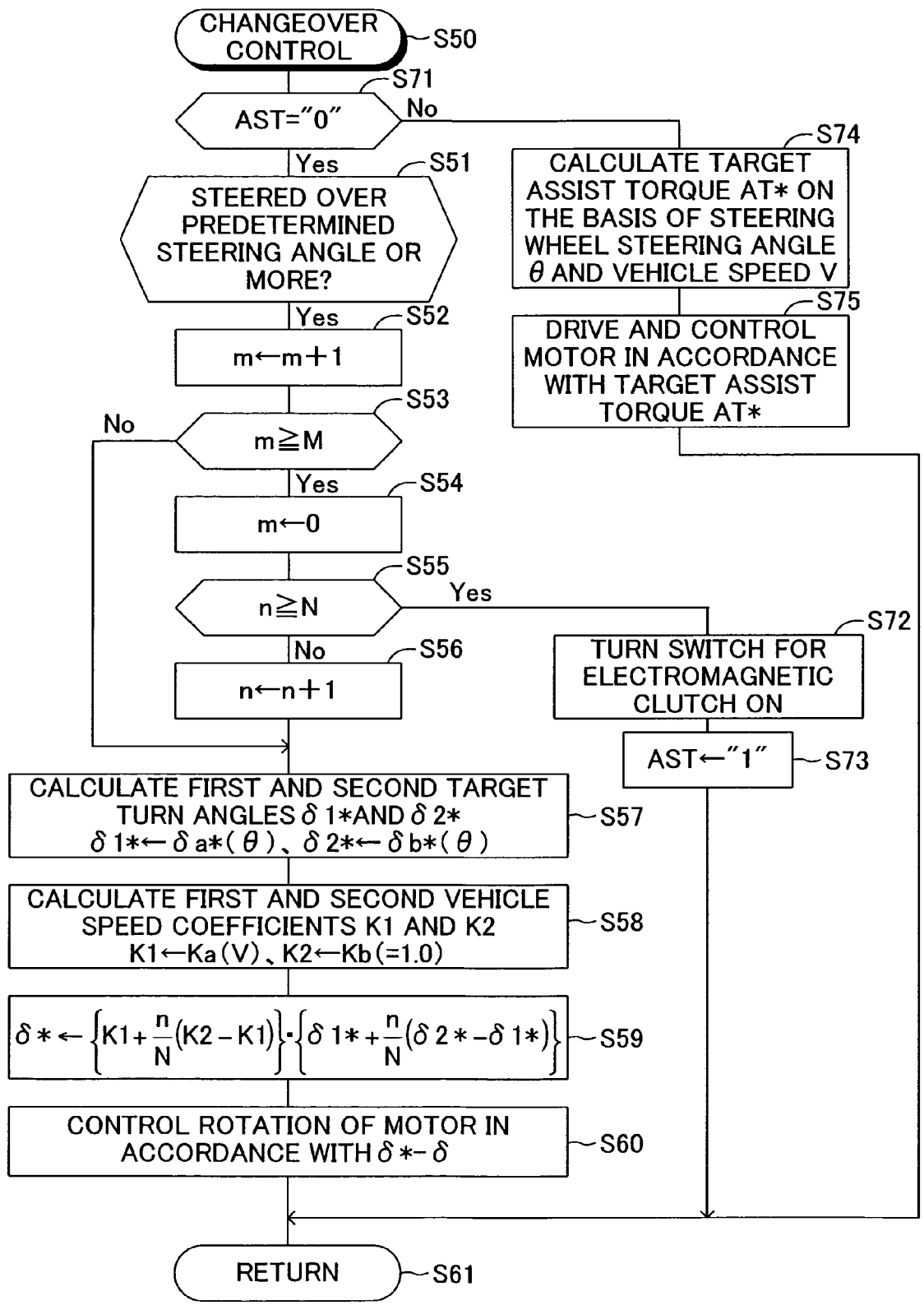
FIG. 7 is a flowchart showing the details of the changeover control routine according to a modification of the first embodiment.

Next, there will be described a modification of the first embodiment which employs a changeover control routine which partially differs from the above-described changeover control routine. The changeover control routine according to the present modification is shown in FIG. 7, and differs from the changeover control routine of FIG. 4 in that the processing of steps S71 to 75 is added. When the execution of the changeover control routine according to the present modification is started, the first turning ECU 34 (or the second turning ECU 35) proceeds to step S71 so as to determine whether the value of an assist flag AST is "0." The assist flag AST represents an unassisted state when its value is "0," and represents an assisted state when its value is "1." The assist flag AST is initially set to "0." This assist flag AST is also stored in a nonvolatile memory when the first turning ECU 34 (or the second turning ECU 35) does not operate, whereby the value of the assist flag AST is maintained even when the ignition switch is turned off. The assisted state means that when a failure has arisen in either one of the first and second turning control systems, the electric motor 21 or 22 of the other system in which no failure has arisen is used to assist the turning of the left and right front wheels FW1 and FW2 effected by the turning operation imparted to the steering wheel 11.

When the assist flag AST is "0," the processing of step S51 and steps subsequent thereto is performed. The present modification is the same as the above-described embodiment in that when a failure arises in the second turning control system (or the first turning control system), the first turning ECU 34 (or the second turning ECU 35) performs the processing of steps S51 to S61 so as to gradually change the turning characteristic of the left and right front wheels FW1 and FW2 in relation to the steering operation applied to the steering wheel 11 from that of the steer-by-wire mode to that of the steer-by-mechanical connection mode. In this case, when the variable n becomes equal to the predetermined value N, the first turning ECU 34 (or the second turning ECU 35) makes a "Yes" determination in step S55 and then performs the processing of steps S72 and S73.

In step S72, the first turning ECU 34 (or the second turning ECU 35) switches the switch circuit 41 (or the switch circuit 42) for the electromagnetic clutch 15 to an on state. In this case, before the first turning ECU 34 (or the second turning ECU 35) starts the execution of the changeover control routine, the switch circuit 42 (or the switch circuit 41) associated with the other turning control system has already been set to an on state. Accordingly, in this modification, after the turning characteristic of the left and right front wheels FW1 and FW2 is switched from that of the steer-by-wire mode to that of the steer-by-mechanical connection mode, electricity is supplied to the electromagnetic clutch 15, whereby the upper portion and lower portion of the steering shaft 12 are mechanically connected together. As a result, in this modification, the steering mode is changed to the steer-by-mechanical connection mode before failures arise in both the first and second turning control systems.

Figure 8:
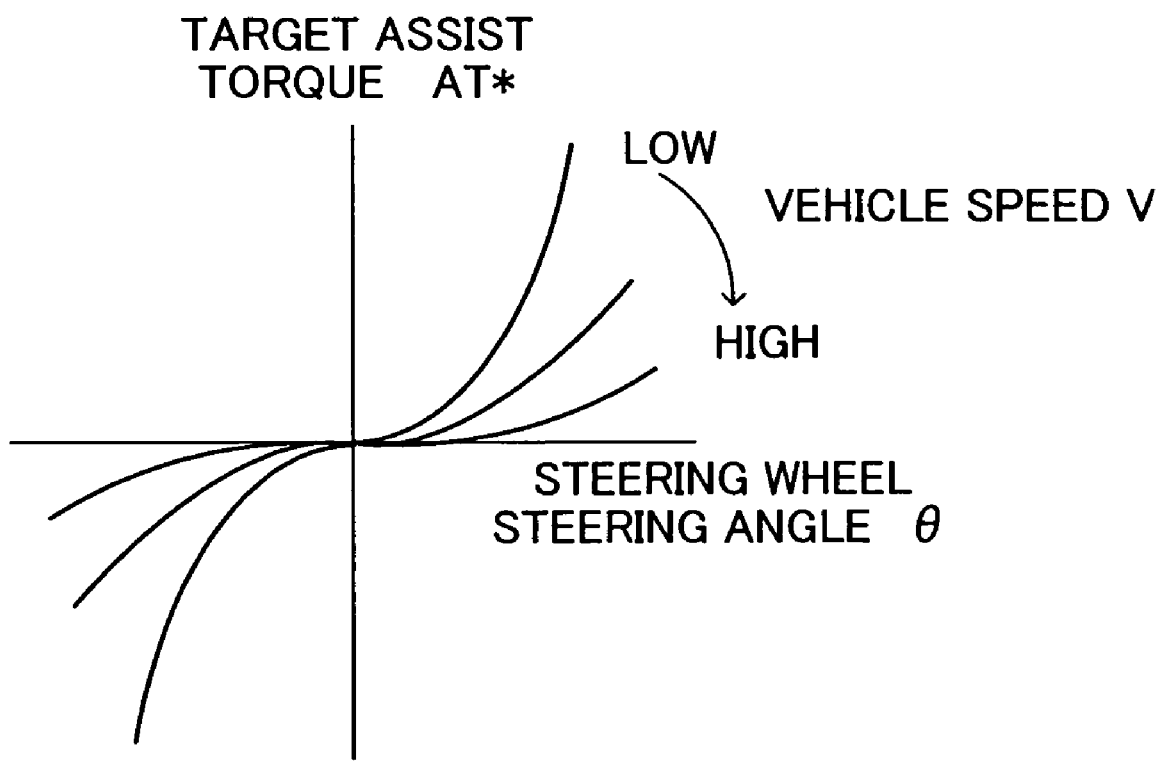
FIG. 8 is a graph relating to the modification and showing the relation among steering wheel steering angle, vehicle speed, and target assist torque.

After the processing of step S72, the assist flag AST is set to "1" in step S73. During the next and subsequent executions of the changeover control routine, the first turning ECU 34 (or the second turning ECU 35) makes a "No" determination in step S71, and performs the processing of steps S74 and 75. In step S74, the first turning ECU 34 (or the second turning ECU 35) calculates a target assist torque AT*, which changes in accordance with the steering wheel steering angle θ and the vehicle speed V, with reference to an assist instruction value table stored in the ROM. As shown in FIG. 8, this assist instruction value table defines, for each of a plurality of representative vehicle speeds, a target assist torque AT*, which increases nonlinearly with the steering wheel steering angle θ. Notably, instead of using the assist torque table, a previously prepared function which represents the target assist torque AT*, which changes in accordance with the steering wheel steering angle θ and the vehicle speed V, may be used so as to calculate the target assist torque AT*.

Subsequently, in step S75, the first turning ECU 34 (or the second turning ECU 35) controls the electric motor 21 (or the electric motor 22) via the drive circuit 37 (or the drive circuit 38) so as to operate the electric motor 21 (or the electric motor 22) such that the calculated target assist torque AT* is generated. Thus, the operation of turning the steering wheel 11 is assisted by means of the electric motor 21 (or the electric motor 22). Notably, in this case as well, after the electromagnetic clutch 15 is switched to a connected state, the operation of the electric motor 16 for steering reaction is stopped, or the operation of the electric motor 16 is controlled such that the electric motor 16 generates steering assist force.

As described above, in the steering apparatus for a vehicle according to the present modification, when a failure arises in one turning control system, by means of the other turning control system, the turning characteristic of the left and right front wheels FW1 and FW2 in relation to the steering operation applied to the steering wheel 11 is gradually changed from that of the steer-by-wire mode to that of the steer-by-mechanical connection mode, and then the steering mode of the left and right front wheels FW1 and FW2 is switched to the steer-by-mechanical connection mode. Then, the turning of the left and right front wheels FW1 and FW2 effected by the steering operation applied to the steering wheel in the switched mode is assisted by the other turning control system. By virtue of this operation, before a failure arises in the other turning control system as a result of harsh use of the electric motor 21 (or the electric motor 22) belonging to the other turning control system, the steering mode is switched to the steer-by-mechanical connection mode, whereby proper fail safety of the vehicle is secured. Moreover, since the diver's steering operation applied to the steering wheel 11 is assisted by the other turning control system, the driver can steer the steering wheel 11 lightly.

b. Second Embodiment

Figure 9:
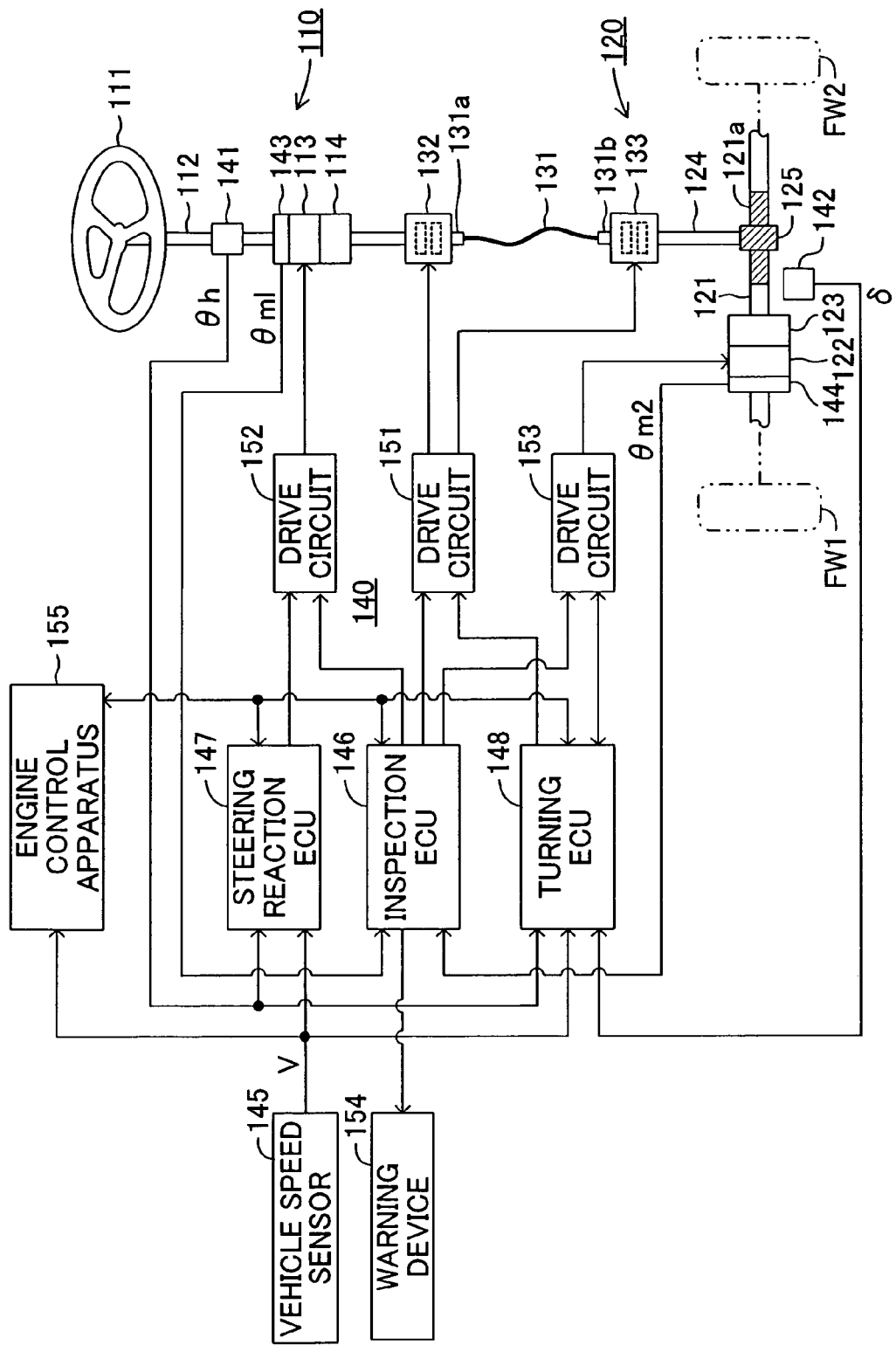
FIG. 9 is an overall schematic diagram of a steering apparatus for a vehicle according to a second embodiment of the present invention.

Next, a second embodiment of the present invention will be described with reference to the drawings. FIG. 9 is an overall schematic diagram of a steering apparatus for a vehicle according to the second embodiment.

This steering apparatus employs a steer-by-wire system in which a steering operation apparatus 110 which is operated by a driver is mechanically separated from a turning apparatus 120 which turns the left and right front wheels FW1 and FW2 (steerable wheels) in accordance with the steering operation of the driver. The steering operation apparatus 110 includes a steering wheel 111, which serves as a steering member to be turned by the driver. The steering wheel 111 is fixed to the upper end of a steering input shaft 112. An electric motor for steering reaction (electric actuator) 113 is assembled to a lower portion of the steering input shaft 112. The steering reaction electric motor 113 rotates the steering input shaft 112 about its axis via a speed reduction mechanism 114.

The turning apparatus 120 includes a rack bar 121 disposed to extend in the lateral direction of the vehicle. Left and right front wheels FW1 and FW2 are steerably connected to the opposite ends of the rack bar 121 via unillustrated tie rods and knuckle arms. The left and right front wheels FW1 and FW2 are turned leftward or rightward in accordance with axial displacement of the rack bar 121. An electric motor for turning (electric actuator) 122 is assembled to an unillustrated housing and surrounds the rack bar 121. Rotation of the turning electric motor 122 is reduced in speed and is converted to linear motion of the rack bar 121 by means of a screw feed mechanism 123. The turning apparatus 120 also includes a steering output shaft 124, which is rotatable about its axis. A pinion gear 125 is connected to the lower end of the steering output shaft 124, and is in meshing engagement with rack teeth 121a formed on the rack bar 121, so that the rack bar 121 axially displaces as a result of rotation of the steering output shaft 124 about its axis. Notably, the steering input shaft 112, the steering output shaft 124, the pinion gear 125, the rack bar 121, and other relevant components constitute the steering transmission mechanism of the present invention.

A cable 131, serving as an intermediate member, is disposed between the steering input shaft 112 and the steering output shaft 124. The cable 131 transmits rotation of the steering input shaft 112 about its axis to the steering output shaft 124. A first electromagnetic clutch 132 is disposed between a fixing member 131a at the upper end of the cable 131 and the lower end of the steering input shaft 112. When electricity is not supplied to the first electromagnetic clutch 132, the first electromagnetic clutch 132 is in a disconnected state, so that the cable 131 and the steering input shaft 112 are disconnected from each other, whereby power transmission therebetween is prevented. When electricity is supplied to the first electromagnetic clutch 132, the first electromagnetic clutch 132 is in a connected state, so that the cable 131 and the steering input shaft 112 are connected with each other, whereby power transmission therebetween is permitted. A second electromagnetic clutch 133 is disposed between a fixing member 131b at the lower end of the cable 131 and the upper end of the steering output shaft 124. When electricity is not supplied to the second electromagnetic clutch 133, the second electromagnetic clutch 133 is in a disconnected state, so that the cable 131 and the steering output shaft 124 are disconnected from each other, whereby power transmission therebetween is prevented. When electricity is supplied to the second electromagnetic clutch 133, the second electromagnetic clutch 133 is in a connected state, so that the cable 131 and the steering output shaft 124 are connected with each other, whereby power transmission therebetween is permitted. By virtue of such a configuration, in the second embodiment, a connection-disconnection apparatus, composed of the first and second electromagnetic clutches 132 and 133 connected in series via the cable 131 is interposed in the steering transmission mechanism.

Next, there will be described an electric control apparatus 140 capable of inspecting and controlling the steering reaction electric motor 113, the turning electric motor 122, and the electromagnetic clutches 132 and 133. The electric control apparatus 140 includes a steering angle sensor 141, a turn angle sensor 142, rotational angle sensors 143 and 144, and a vehicle speed sensor 145. The steering angle sensor 141 is assembled to the steering input shaft 112. The angle sensor 141 detects rotational angle of the steering wheel 111 from its neutral position by measuring rotation of the steering input shaft 112 about its axis, and outputs the rotational angle as steering wheel steering angle θh. The steering wheel steering angle θh becomes zero when the steering wheel 111 is located at the neutral position, assumes a positive value when the steering angle is a clockwise angle, and assumes a negative value when the steering angle is a counterclockwise angle. The turn angle sensor 142 is assembled to the rack bar 121. The turn angle sensor 142 detects and outputs actual turn angle turn angle δ of the left and right front wheels FW1 and FW2 by measuring axial displacement of the rack bar 121. Notably, the actual turn angle δ becomes zero when the left and right front wheels FW1 and FW2 are located at the neutral position, assumes a positive value when the turn angle of the left and right front wheels FW1 and FW2 is a clockwise angle, and assumes a negative value when the turn angle of the left and right front wheels FW1 and FW2 is a counterclockwise angle.

The rotational angle sensors 143 and 144 are assembled to the steering reaction electric motor 113 and the turning electric motor 122, respectively, and detect respective rotational angles θm1 and θm2 of these electric motors 113 and 122 with respect to the reference positions. The rotational angle θm1 becomes zero at the neutral position, assumes a positive value when the rotational angle is an angle in the direction corresponding to clockwise steering of the steering wheel 111, and assumes a negative value when the rotational angle is an angle in the direction corresponding to counterclockwise steering of the steering wheel 111. The rotational angle θm2 becomes zero at the neutral position, assumes a positive value when the rotational angle is an angle in the direction corresponding to clockwise turning of the left and right front wheels FW1 and FW2, and assumes a negative value when the rotational angle is an angle in the direction corresponding to counterclockwise turning of the left and right front wheels FW1 and FW2. Notably, in the present embodiment, the rotational angle sensor 143 functions as a sensor for detecting rotational displacement of the steering input shaft 112, and the rotational angle sensor 144 functions as a sensor for detecting rotational displacement of the steering output shaft 124 and axial displacement of the rack bar 121. The vehicle speed sensor 145 detects vehicle speed V, and outputs a signal indicative of the vehicle speed V.

Further, the electric control apparatus 140 includes an electronic control unit for inspection (hereinafter referred to as the "inspection ECU") 146, an electronic control unit for steering reaction control (hereinafter referred to as the "steering reaction ECU") 147, and an electronic control unit for turning control (hereinafter referred to as the "turning ECU") 148, which are connected with one another. The rotational angle sensors 143 and 144 are connected to the inspection ECU 146. The steering angle sensor 141 and the vehicle speed sensor 145 are connected to the steering reaction ECU 147. The steering angle sensor 141, the turn angle sensor 142, and the vehicle speed sensor 145 are connected to the turning ECU 148.

Each of the ECU 146 to 148 is mainly formed by a microcomputer composed of a CPU, ROM, RAM, etc. The inspection ECU 146 detects an anomaly of the electromagnetic clutches 132 and 133 by executing an inspection program of FIG. 10. During the execution of this inspection program, the inspection ECU 146 switches and controls the first and second electromagnetic clutches 132 and 133 via a drive circuit 151, and drives and controls the steering reaction electric motor 113 and the turning electric motor 122 via dive circuits 152 and 153. Further, when an anomaly of the first or second electromagnetic clutch 132 or 133 is detected, the inspection ECU 146 causes a warning device 154 to provide a warning. The steering reaction ECU 147 drives and controls the steering reaction electric motor 113 via the drive circuit 152 by executing a steering reaction control program of FIG. 11. The turning ECU 148 drives and controls the turning electric motor 122 via the drive circuit 153 by executing a turning control program of FIG. 12.

An engine control apparatus 155 is also connected to the ECU 146 to 148. The engine control apparatus 155 includes a microcomputer composed of a CPU, ROM, RAM, etc. The engine control apparatus 155 receives the vehicle speed V from the vehicle speed sensor 145, and controls an engine in accordance with an instruction from the inspection ECU 146o thereby control the traveling speed of the vehicle.

Next, operation of the second embodiment having the above-described configuration will be described. In response to the ignition switch being turned on, the inspection ECU 146 executes the inspection program only one time immediately after the ignition switch is turned on. Further, in response to the ignition switch being turned on, the steering reaction ECU 147 and the turning ECU 148 start to repeatedly execute the steering reaction control program and the turning control program, respectively, at predetermined short intervals.

Figure 10:
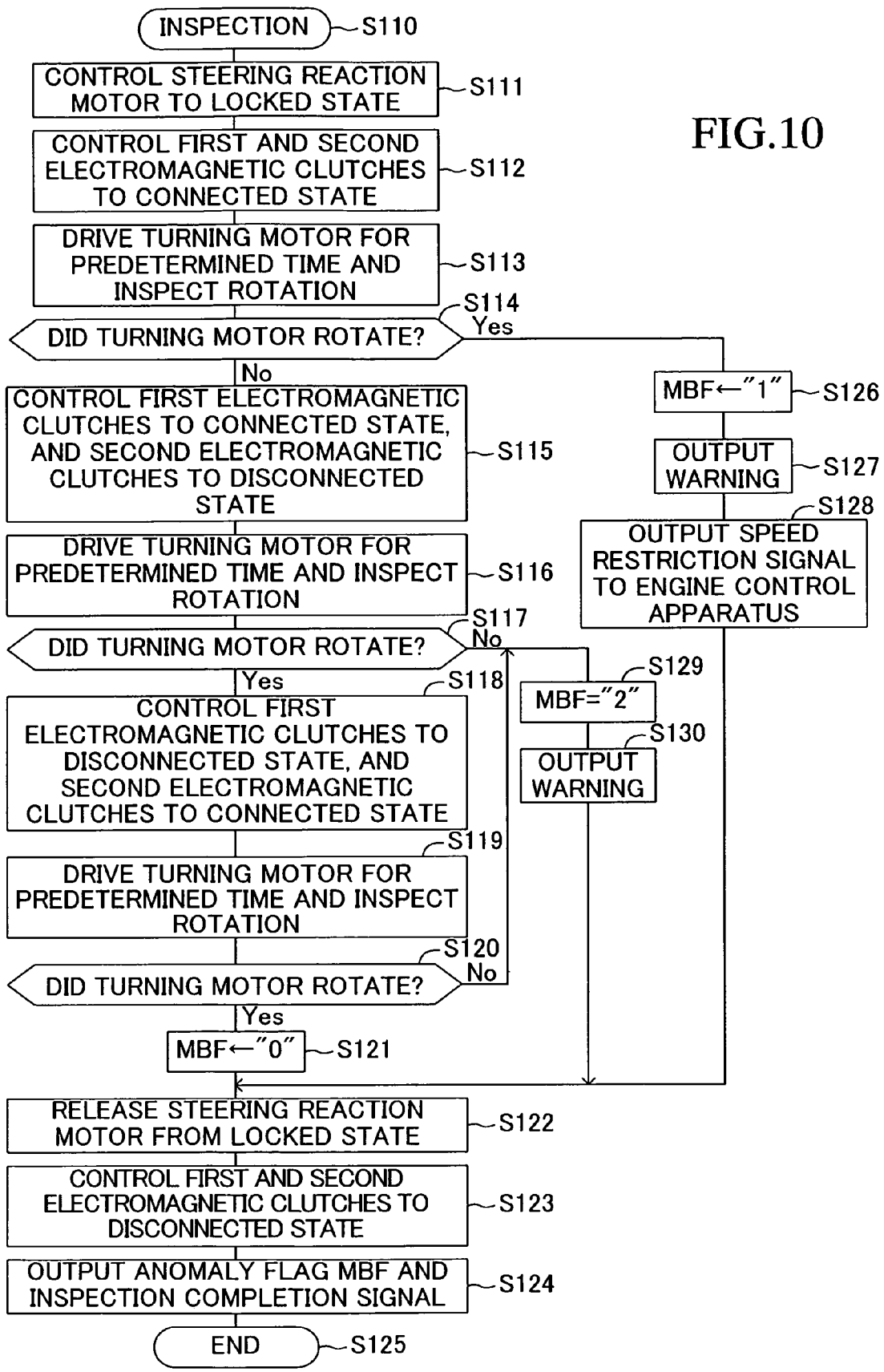
FIG. 10 is a flowchart showing an inspection program executed by an inspection ECU of FIG. 9.

The execution of the inspection program is started from step S110 of FIG. 10. In step S111, the inspection ECU 146 controls the steering reaction electric motor 113 to a locked state. Specifically, the inspection ECU 146, in cooperation with the drive circuit 152, supplies to the steering reaction electric motor 113 a control current for generating a static magnetic field, to thereby bring the steering reaction electric motor 113 into a state in which the rotor of the steering reaction electric motor 113 does not rotate. Notably, the lock control of the steering reaction electric motor 113 is performed so as to prohibit rotational displacement of the steering input shaft 112 about its axis. In order to prevent the steering reaction electric motor 113 from being rotated by the rotation force of the turning electric motor 122 to be described later, the control current for generating a static magnetic field is set to a large value. Next, in step S112, the inspection ECU 146, in cooperation with the drive circuit 151, supplies electricity to the first and second electromagnetic clutches 132 and 133 to thereby bring each of the first and second electromagnetic clutches 132 and 133 into a connected state.

After the processing of step S112, in step S113, the inspection ECU 146 cooperates with the drive circuit 153 so as to drive and control the turning electric motor 122 by supplying to the turning electric motor 122 a drive current for causing the turning electric motor 122 to rotate for a predetermined short period of time. Further, in step S113, in parallel with driving and controlling of the turning electric motor 122, the inspection ECU 146 receives a signal indicative of the rotational angle θm2 from the rotational angle sensor 144 and inspects whether the turning electric motor 122 has rotated. Next, in step S114, the inspection ECU 146 determines whether rotation of the turning electric motor 122 is detected by the inspection in step S113. Notably, this processing for detecting rotation of the turning electric motor 122 and similar processing to be described later correspond to detection of rotational displacement of the steering output shaft 124 about its axis and axial displacement of the rack bar 121.

First, the case where both the first and second electromagnetic clutches 132 and 133 are normal will be described. In this case, since the first and second electromagnetic clutches 132 and 133 are brought into a connected state by the processing of step S112 and rotation of the steering input shaft 112 is prohibited by the lock control of the steering reaction electric motor 113 in step S111, the rotational displacement of the steering output shaft 124 and the axial displacement of the rack bar 121 are also prohibited via the cable 131. Accordingly, the turning electric motor 122 does not rotate, and the inspection ECU 146 makes a "No" determination in step S114, and proceeds to step S115.

The processing of steps S112 to S114 is adapted to detect an anomalous state in which the first or second electromagnetic clutch 132 or 133 is continuously maintained in a disconnected state at all times irrespective of control (anomaly of erroneous disconnection of the first or second electromagnetic clutch 132 or 133). The "No" determination in the above-described step S114 means that the anomaly of erroneous disconnection has not occurred in the first or second electromagnetic clutches 132 or 133.

In step S115, the inspection ECU 146 cooperates with the drive circuit 151 so as to supply electricity to the first electromagnetic clutch 132 to thereby bring the first electromagnetic clutch 132 into a connected state, and to stop supply of electricity to the second electromagnetic clutch 133 to thereby bring the second electromagnetic clutch 133 into a disconnected state. Next, through the processing of step S116 similar to that of the previously described step S113, the inspection ECU 146 inspects whether the turning electric motor 122 rotates or not, while driving the turning electric motor 122 for a predetermined short period of time. Subsequently, in step S117, the inspection ECU 146 determines whether rotation of the turning electric motor 122 has been detected by the inspection in step S116. In this case, the second electromagnetic clutch 133 is in a disconnected state, and the turning electric motor 122 rotates. Therefore, the inspection ECU 146 makes a "Yes" determination in step S117, and proceeds to step S118.

The processing of steps S115 to S117 is adapted to detect an anomalous state in which the second electromagnetic clutch 133 is continuously maintained in a connected state at all times irrespective of control (anomaly of erroneous connection of the second electromagnetic clutch 133). The "Yes" determination in the above-described step S117 means that the anomaly of erroneous connection has not occurred in the second electromagnetic clutch 133.

In step S118, the inspection ECU 146 cooperates with the drive circuit 151 so as to stop supply of electricity to the first electromagnetic clutch 132 to thereby bring the first electromagnetic clutch 132 into a disconnected state, and to supply electricity to the second electromagnetic clutch 133 to thereby bring the second electromagnetic clutch 133 into a connected state. Next, through the processing of step S119 similar to that of the previously described step S113, the inspection ECU 146 inspects whether the turning electric motor 122 rotates or not, while driving the turning electric motor 122 for a predetermined short period of time. Subsequently, in step S120, the inspection ECU 146 determines whether rotation of the turning electric motor 122 has been detected by the inspection in step S119. In this case, the first electromagnetic clutch 132 is in a disconnected state, and the turning electric motor 122 rotates. Therefore, the inspection ECU 146 makes a "Yes" determination in step S120.

The processing of steps S118 to S120 is adapted to detect an anomalous state in which the first electromagnetic clutch 132 is continuously maintained in a connected state at all times irrespective of control (anomaly of erroneous connection of the first electromagnetic clutch 132). The "Yes" determination in the above-described step S120 means that the anomaly of erroneous connection has not occurred in the first electromagnetic clutch 132.

Next, in step S121, the inspection ECU 146 sets an anomaly flag MBF, which represents an normal or anomalous state of the first and second electromagnetic clutches 132 and 133, to a value of "0" representing that the first and second electromagnetic clutches 132 and 133 are normal. After the processing of steps S122 to S124, the inspection ECU 146 proceeds to step S125 so as to end the present inspection program.

In step S122, the inspection ECU 146, in cooperation with the drive circuit 152, stops supply of electricity to the steering reaction electric motor 113 to thereby release the steering reaction electric motor 113 from the locked state. In step S123, the inspection ECU 146, in cooperation with the drive circuit 151, stops supply of electricity to the first and second electromagnetic clutches 132 and 133 to thereby bring them into a disconnected state. In step S124, the inspection ECU 146 outputs the value "0" of the anomaly flag MBF to the turning ECU 148, and outputs an inspection completion signal to the steering reaction ECU 147 and the turning ECU 148.

Figure 11:
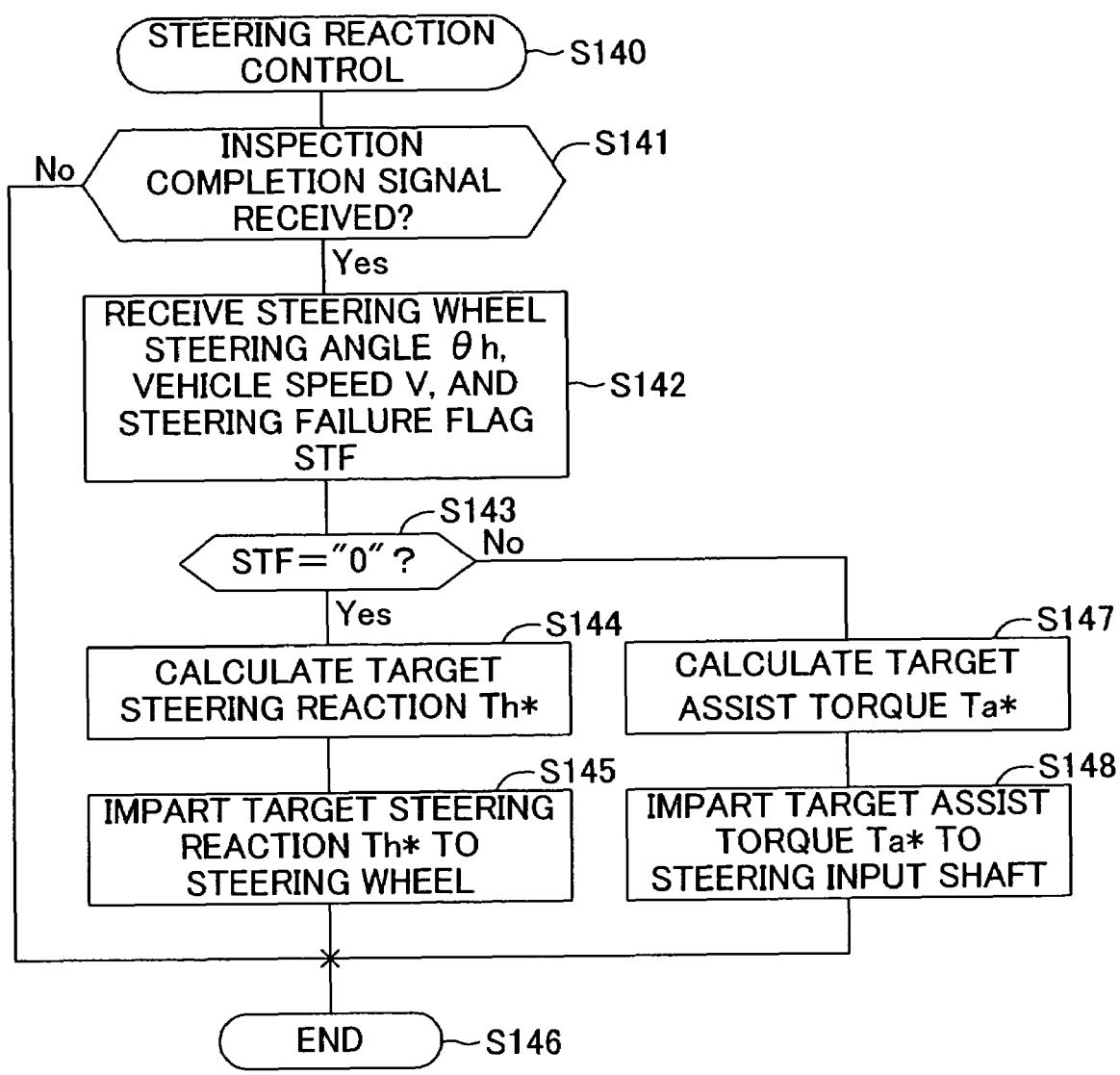
FIG. 11 is a flowchart showing a steering reaction control program executed by a steering reaction ECU of FIG. 9.

Meanwhile, after the ignition switch is turned on, the steering reaction ECU 147 repeatedly executes the steering reaction control program of FIG. 11 at predetermined short intervals. The execution of the steering reaction control program is started from step S140. In step S141, the steering reaction ECU 147 determines whether it has received the inspection completion signal from the inspection ECU 146. In the case where the steering reaction ECU 147 has not yet received the inspection completion signal after the ignition switch had been turned on, the steering reaction ECU 147 makes a "No" determination in step S141, and proceeds to step S146 so as to end the current execution of the steering reaction control program. In this state, the steering reaction ECU 147 does not execute substantial processing, and waits for the inspection completion signal.

When the inspection ECU 146 issues the inspection completion signal after completion of the inspection of the first and second electromagnetic clutches 132 and 133 as described above, the steering reaction ECU 147 makes a "Yes" determination in step S141, and proceeds step S142. In step S142, the steering reaction ECU 147 receives the steering wheel steering angle θh from the steering angle sensor 141, the vehicle speed V from the vehicle speed sensor 145, and the value of a steering failure flag STF from the turning ECU 148. As will be described in detail, the turning ECU 148 sets the steering failure flag STF. When the value is "0," the steering failure flag STF represents that the turning control system composed of the turning electric motor 122 and the drive circuit 153 is in a normal state. When the value is "1," the steering failure flag STF represents that the turning control system is in an anomalous state.

Here, the description will be continued under the assumption that the turning control system is normal. Therefore, the steering reaction ECU 147 makes a "Yes" determination in step S143; i.e., determines that the value of the steering failure flag STF is "0," and proceeds to step S144.

Figure 14:
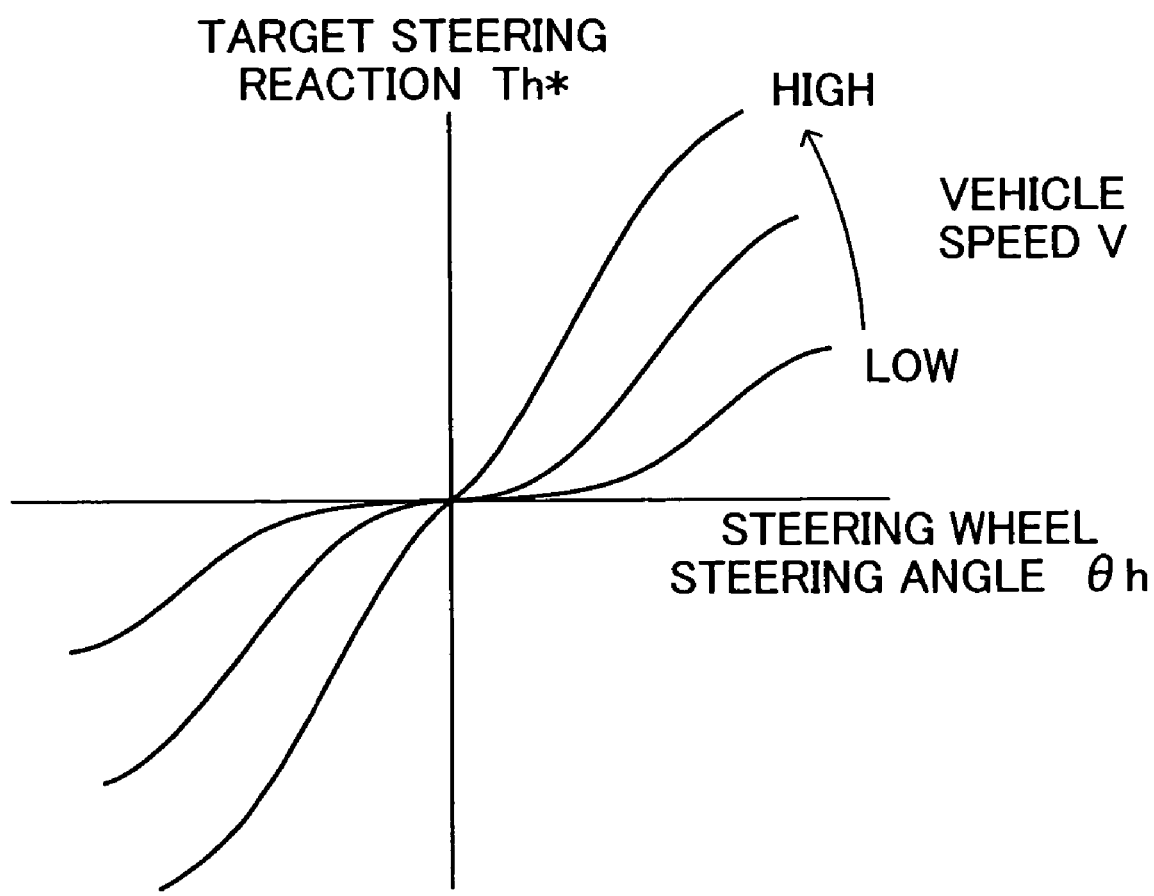
FIG. 14 is a graph showing the relation between steering wheel steering angle and target steering reaction.

In step S144, the steering reaction ECU 147 calculates a target steering reaction Th*, which changes in accordance with the steering wheel steering angle θh and the vehicle speed V, with reference to a steering reaction table stored in the ROM. As shown in FIG. 14, this steering reaction table defines, for each of a plurality of representative vehicle speeds, a target steering reaction Th*, which increase nonlinearly with the steering wheel steering angle θh. Notably, instead of using the steering reaction table, a previously prepared function which represents the target steering reaction Th*, which changes in accordance with the steering wheel steering angle θh and the vehicle speed V, may be used so as to calculate the target steering reaction Th*.

Subsequently, in step S145, the steering reaction ECU 147, in cooperation with the drive circuit 152, supplies to the steering reaction electric motor 113 a drive current corresponding to the calculated target steering reaction Th*. Subsequently, the steering reaction ECU 147 proceeds to step S146 so as to end the current execution of the steering reaction control program. The steering reaction electric motor 113 drives the steering input shaft 112 with a rotational torque corresponding to the target steering reaction Th*. As a result, the target steering reaction Th* produced by the steering reaction electric motor 113 is applied to the steering wheel 111 which is turned by the driver. Thus, the drier can turn the steering wheel 111 while feeling a proper steering reaction.

Figure 12:
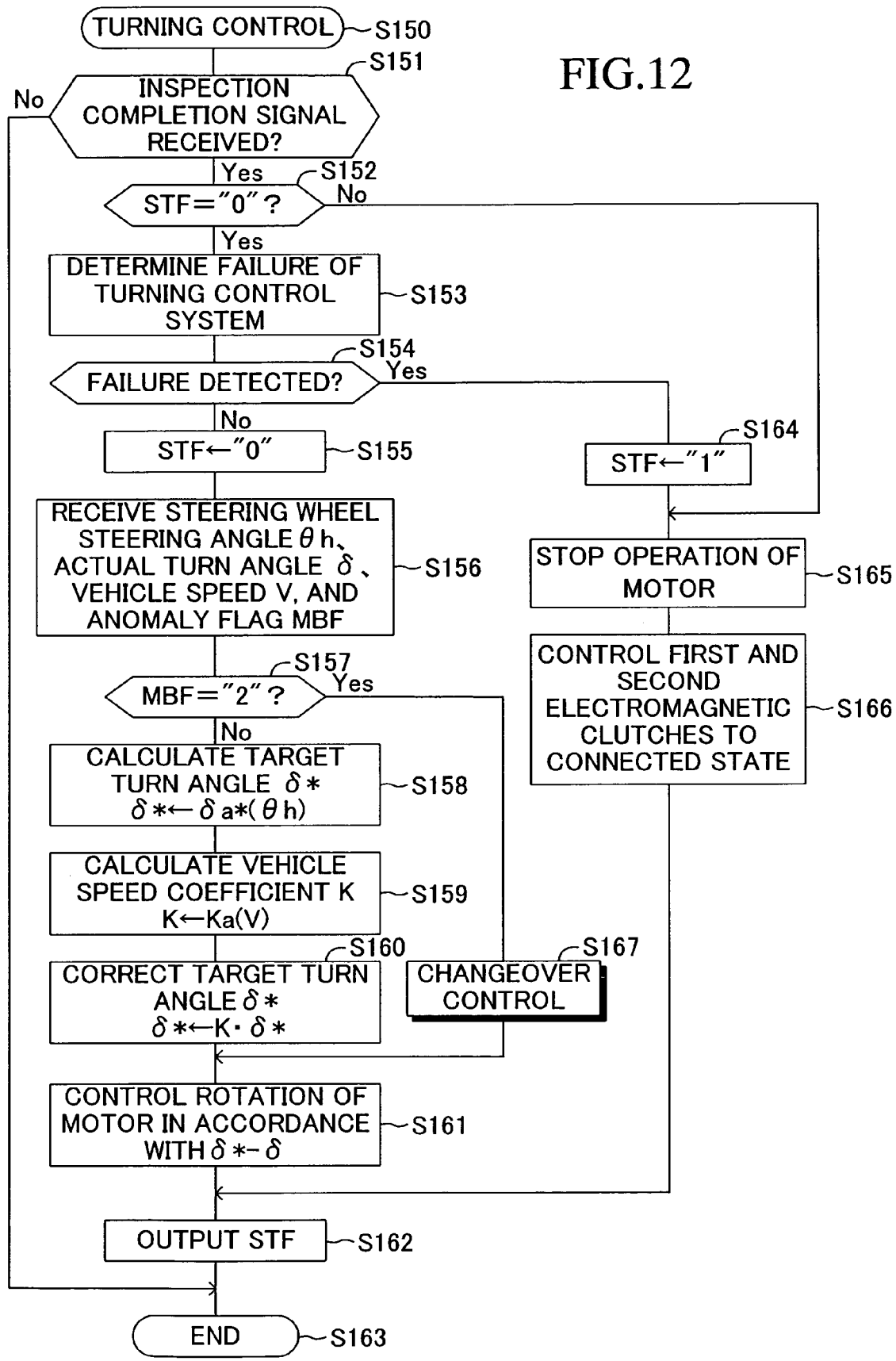
FIG. 12 is a flowchart showing a turning control program executed by a turning ECU of FIG. 9.

Further, after the ignition switch is turned on, the turning ECU 148 repeatedly executes the turning control program of FIG. 12 at predetermined short intervals. The execution of the turning control program is started from step S150. In step S151, the turning ECU 148 determines whether it has received the inspection completion signal from the inspection ECU 146. In the case where the turning ECU 148 has not yet received the inspection completion signal after the ignition switch had been turned on, the turning ECU 148 makes a "No" determination in step S151, and proceeds to step S163 so as to end the current execution of the turning control program. In this state, the turning ECU 148 does not execute substantial processing, and waits for the inspection completion signal.

When the inspection ECU 146 issues the inspection completion signal after completion of the inspection of the first and second electromagnetic clutches 132 and 133 as described above, the turning ECU 148 makes a "Yes" determination in step S151, and proceeds step S152 so as to determine whether the value of the steering failure flag STF is "0." As described previously, at the present point in time, the value of the steering failure flag STF is "0." Therefore, the turning ECU 148 makes a "Yes" determination in step S152, and proceeds to step S153.

In step S153, the turning ECU 148 inspects whether a failure has arisen in the turning control system composed of the turning electric motor 122 and the drive circuit 153. Specifically, the turning ECU 148 receives from the drive circuit 153 signals indicating wire breakage, short circuit, or any other anomalies of the electric motor 122, and inspects whether a failure has arisen in the turning control system. Next, the turning ECU 148 proceeds to step S154 so as to determine whether a failure has been detected by the processing of step S153. Here, the description will be continued under the assumption that no failure has been detected by the processing of steps S153 and S154. In this case, after making a "No" determination in step S154, the turning ECU 148 sets the steering failure flag STF to "0" in step S155, and then performs the processing of step S156 and steps subsequent thereto. Notably, the steering failure flag STF is stored and held in a nonvolatile memory area when the turning ECU 148 does not operate, whereby the value of the steering failure flag STF is maintained even when the ignition switch is turned off.

In step S156, the turning ECU 148 receives the steering wheel steering angle θh from the steering angle sensor 141, the actual turn angle δ from the turn angle sensor 142, the vehicle speed V from the vehicle speed sensor 145, and the value of the anomaly flag MBF from the inspection ECU 146. Next, in step S157, the turning ECU 148 determines whether the value of the anomaly flag MBF is "2." Here, the description will be continued under the assumption that the value of the anomaly flag MBF is "0."

Accordingly, the turning ECU 148 makes a "No" determination in step S157, and performs the processing of step S158 and steps subsequent thereto. In step S158, the turning ECU 148 calculates a target turn angle δa* for steer-by-wire, which changes in accordance with the steering wheel steering angle θh, with reference to a first turn angle table stored in the ROM, and stores, as a target turn angle δ*, the calculated target turn angle δa* for steer-by-wire. This first turn angle table is identical to the first turn angle table used in the first embodiment (see the solid line of FIG. 5). Notably, in this case as well, the target turn angle δa* for steer-by-wire may be calculated by use of a previously prepared function.

Next, in step S159, the turning ECU 148 calculates a vehicle speed coefficient Ka for steer-by-wire, which changes in accordance with the vehicle speed V, with reference to a vehicle speed coefficient table stored in the ROM, and stores, as a vehicle speed coefficient K, the calculated vehicle speed coefficient Ka for steer-by-wire. This vehicle speed coefficient table is identical to the vehicle speed coefficient table used in the first embodiment (see the solid line of FIG. 6). Notably, in this case as well, the vehicle speed coefficient Ka for steer-by-wire may be calculated by use of a previously prepared function.

After having determined the target turn angle δ* and the vehicle speed coefficient K, in step S160, the turning ECU 148 corrects the target turn angle δ* with the vehicle speed coefficient K through performance of calculation in accordance with the following Eq. 3, to thereby obtain a final target turn angle δ*.

$$\delta^* = K \cdot \delta^* \qquad \text{Eq. 3}$$

In step S161, the turning ECU 148 controls rotation of the turning electric motor 122 via the drive circuit 153 in accordance with the difference (δ*−δ) between the final target turn angle δ* and the actual turn angle δ so that the actual turn angle δ becomes equal to the final target turn angle δ*. As a result, the turning electric motor 122 is driven to rotate so as to axially move the rack bar 121 via the screw feed mechanism 123, to thereby turn the left and right front wheels FW1 and FW2 to the target turn angle δ*.

With the above turning control, as indicated by the solid line of FIG. 5, the left and right front wheels FW1 and FW2 are turned to a small extent with respect to change in the steering wheel steering angle θh in the range in which the steering angle θh is small, and are turned to a large extent with respect to change in the steering wheel steering angle θh in the range in which the steering angle θh is large. As a result, the drive can turn the left and right front wheels FW1 and FW2 to a large turn angle without changing the positions of his hands on the steering wheel 111. Further, as indicated by the solid line of FIG. 6, the left and right front wheels FW1 and FW2 are turned to a large extent in relation to the steering wheel steering angle θh when the vehicle speed V is low, and are turned to a small extent in relation to the steering wheel steering angle θh when the vehicle speed V increases. After the processing of step S161, in step S162, the turning ECU 148 outputs the value of the steering failure flag STF to the steering reaction ECU 147. After that, in step S163, the turning ECU 148 ends the turning control program.

Next, the case in which a failure has arisen in the turning control system will be described. In this case, the turning ECU 148 makes a "Yes" determination in step S154 of FIG. 12, and then proceeds to step S164 so as to set the steering failure flag STF to "1." Subsequently, in step S165, the turning ECU 148 stops controlling the operation of the turning electric motor 122 to thereby stop the turning electric motor 122. After that, in step S166, the turning ECU 148 cooperates with the drive circuit 151 so as to supply electricity to the first and second electromagnetic clutches 132 and 133 to thereby bring them into a connected state. After that, in step S162, the turning ECU 148 outputs to the steering reaction ECU 147 the value of the steering failure flag STF having been set to "1." In step S163, the turning ECU 148 ends the current execution of the turning control program.

Once the steering failure flag STF is set to "1," the turning ECU 148 repeats the operation of making a "No" determination in step S152 and executing the processing of the above-described steps S165, S166, and S162. Accordingly, the turning electric motor 122 does not turn the left and right front wheels FW1 and FW2. Meanwhile, since the steering input shaft 112 is connected to the steering output shaft 124 via the first electromagnetic clutch 132, the cable 131, and the second electromagnetic clutch 133 such that power can be transmitted to the steering output shaft 124. Therefore, the turning force applied to the steering wheel 111 is transmitted to the left and right front wheels FW1 and FW2 via the steering input shaft 112, the cable 131, the steering output shaft 124, and the rack bar 121, whereby the left and right front wheels FW1 and FW2 are turned by the turning force applied to the steering wheel 111.

Meanwhile in this state, by the processing of step S142 of FIG. 11, the steering reaction ECU 147 receives the value of the steering failure flag STF having been set to "1," makes a "No" determination in step S143, and then proceeds to step S147. In step S147, the steering reaction ECU 147 calculates a target assist torque Ta*, which changes in accordance with the steering wheel steering angle θh and the vehicle speed V, with reference to an assist instruction value table stored in the ROM. This assist instruction value table is the same as the assist instruction value table used in the first embodiment (see FIG. 8). In this case as well, the target assist torque Ta* may be calculated by use of a previously prepared function.

Subsequently, in step S148, the steering reaction ECU 147 cooperates with the drive circuit 152 so as to supply to the steering reaction electric motor 113 a drive current corresponding to the calculated target assist torque Ta*. Thus, the steering reaction electric motor 113 drives the steering input shaft 112 with a rotational torque corresponding to the target assist torque Ta*. As a result, in a state in which the turning electric motor 122 cannot turn the left and right front wheels FW1 and FW2, the turning of the left and right front wheels FW1 and FW2 by the steering operation applied to the steering wheel 111 is assisted by the target assist torque Ta*, whereby the driver can steer the steering wheel 111 lightly.

Next, the case where an erroneous disconnection anomaly has arisen in one of the first and second electromagnetic clutches 132 and 133 will be described. In this case, even when the inspection ECU 146 controls the first and second electromagnetic clutches 132 and 133 to a connected state by the processing of step S112 of FIG. 10, one of the first and second electromagnetic clutches 132 and 133 in which an erroneous disconnection anomaly has arisen is maintained in a disconnected state. Accordingly, the steering input shaft 112 is separated from the steering output shaft 124 so that power cannot be transmitted to the steering output shaft 124, and through the processing of step S113 and S114, a rotation of the turning electric motor 122; i.e., a rotational displacement of the steering output shaft 124 is detected. Accordingly, the inspection ECU 146 makes a "Yes" determination in step S114, and proceeds to step S126.

In step S126, the inspection ECU 146 sets the anomaly flag MBF to "1." The value of this anomaly flag MBF having been set to "1" is output to the turning ECU 148 by the processing of the above-described step S124. After the processing of step S126, in step S127, the inspection ECU 146 controls the warning device 154 to generate a warning indicating that an erroneous disconnection anomaly has arisen in at least one of the first and second electromagnetic clutches 132 and 133. Next, in step S128, the inspection ECU 146 outputs a speed restriction signal to the engine control apparatus 155.

In this case, through the processing of step S156 of FIG. 12, the turning ECU 148 receives the value of the anomaly flag MBF having been set to "1." Subsequently, the turning ECU 148 makes a "No" determination in step S157, and turns the left and right front wheels FW1 and FW2 by the processing of the above-described steps S158 to S161. In this case, as in the above-described case where both the first and second electromagnetic clutches 132 and 133 are normal, the left and right front wheels FW1 and FW2 are turned to the target turn angle δ* (=Ka·δa*) determined in accordance with the target turn angle δa* for steer-by-wire (solid line in FIG. 5) and the vehicle speed coefficient Ka (solid line in FIG. 6).

Meanwhile, in response to receipt of the speed restriction signal that the inspection ECU 146 has output by the processing of step S128 of FIG. 10, the engine control apparatus 155 controls the engine by use of the vehicle speed signal V from the vehicle speed sensor 145, to thereby restrict the traveling speed of the vehicle to a predetermined speed or lower. That is, when an erroneous disconnection anomaly arises in at least one of the first and second electromagnetic clutches 132 and 133, the traveling speed of the vehicle is restricted to a predetermined speed or lower.

The above operation is performed to impose a restriction on traveling of the vehicle in consideration that in future it becomes impossible to provide a fail-safe function of connecting the steering wheel 111 and the left and right front wheels FW1 and FW2 via the cable 131 in a power transmittable condition when the turning of the left and right front wheels FW1 and FW2 by the turning electric motor 122 becomes impossible. Notably, the predetermined vehicle speed for restricting the traveling speed of the vehicle is preferably set to a relatively low speed. Further, the predetermined vehicle speed may be set to zero so as to prohibit traveling of the vehicle, whereby the traveling stability of the vehicle is secured. Further, before prohibiting traveling of the vehicle, the traveling speed of the vehicle may be restricted to the predetermined vehicle speed or lower for a predetermined period of time required to move the vehicle to a safe place. As a result, the traveling stability of the vehicle is secured.

Next, the case where an erroneous connection anomaly has arisen in the second electromagnetic clutch 133 will be described. In this case, even when the inspection ECU 146 controls the first electromagnetic clutch 132 to a connected state and control the second electromagnetic clutch 133 to a disconnected state by the processing of step S115 of FIG. 10, the second electromagnetic clutch 133 in which an erroneous connection anomaly has arisen is maintained in a connected state. Accordingly, the steering input shaft 112 is connected to the steering output shaft 124 so that power can be transmitted to the steering output shaft 124, and through the processing of step S116 and S117, a rotation of the turning electric motor 122; i.e., a rotational displacement of the steering output shaft 124 is not detected. Accordingly, the inspection ECU 146 makes a "No" determination in step S117, and proceeds to step S129.

In step S129, the inspection ECU 146 sets the anomaly flag MBF to "2." The value of this anomaly flag MBF having been set to "2" is output to the turning ECU 148 by the processing of the above-described step S124. After the processing of step S129, in step S130, the inspection ECU 146 controls the warning device 154 to generate a warning indicating that an erroneous connection anomaly has arisen in the second electromagnetic clutch 133.

Further, in the case where an erroneous connection anomaly has arisen in the first electromagnetic clutch 132, even when the inspection ECU 146 controls the first electromagnetic clutch 132 to a disconnected state and control the second electromagnetic clutch 133 to a connected state by the processing of step S118 of FIG. 10, the first electromagnetic clutch 132 in which an erroneous connection anomaly has arisen is maintained in a connected state. Accordingly, in this case as well, the steering input shaft 112 is connected to the steering output shaft 124 so that power can be transmitted to the steering output shaft 124, and through the processing of step S119 and S120, a rotation of the turning electric motor 122; i.e., a rotational displacement of the steering output shaft 124 is not detected. Accordingly, the inspection ECU 146 makes a "No" determination in step S120. Thus, as in the case where an erroneous connection anomaly has arisen in the second electromagnetic clutch 133, the inspection ECU 146 executes the processing of the above-described steps S129 and S130. However, by the processing of step S130, a warning indicating that an erroneous connection anomaly has arisen in the first electromagnetic clutch 132 is generated.

Meanwhile, in this case, the turning ECU 148 receives, in step S156 of FIG. 12, the value of this anomaly flag MBF having been set to "2," makes a "Yes" determination in step S157, and then proceeds to step S167. In step S167, the turning ECU 148 executes a changeover control routine.

Figure 13:
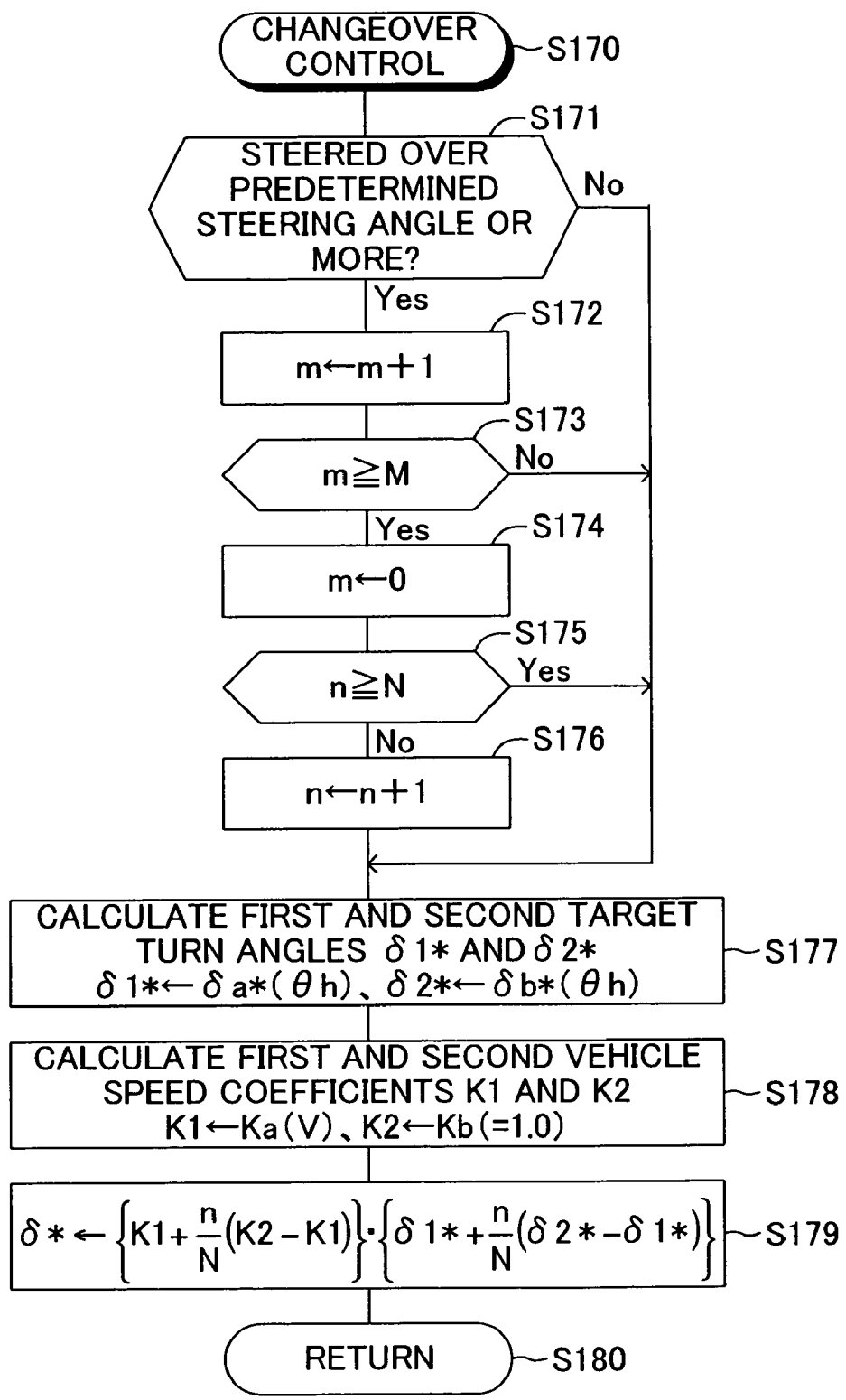
FIG. 13 is a flowchart showing the details of the changeover control routine of FIG. 12.

As shown in detail in FIG. 13, the execution of the changeover control routine is started from step S170. The processing of steps S171 to S179 of the changeover control routine of FIG. 13 is identical to the processing of steps S51 to S59 of the changeover control routine of FIG. 4 in the first embodiment. Accordingly, by the processing of steps S171 to S179, the target turn angle δ* is calculated such that the target turn angle δ* gradually changes from the first target turn angle δ1* to the second target turn angle δ2* in accordance with the number of times the steering wheel 111 has been steered over the predetermined steering angle or more. After calculation of the target turn angle δ*, the turning ECU 148 ends the execution of the changeover control routine in step S180.

After completion of the execution of the changeover control routine, by the processing of step S161 of FIG. 12, the turning ECU 148 steers the left and right front wheels FW1 and FW2 to the target turn angle δ* such that the actual turn angle δ becomes equal to the target turn angle δ*. In this case, as described above, the variable n increases from 1 to the predetermined value N with the number of times the steering wheel 111 has been steered over the predetermined steering angle or more, and the target turn angle δ* gradually changes from the first target turn angle δ1* to the second target turn angle δ2* as the variable n changes from 1 to the predetermined value N. Therefore, the left and right front wheels FW1 and FW2 are gradually turned from the first target turn angle δ1* for steer-by-wire to the second target turn angle δ2* for steer-by-mechanical connection.

This operation is provided under the assumption that when an erroneous connection anomaly arises in one of the first and second electromagnetic clutches 132 and 133, in future, an erroneous connection anomaly will arise in the other of the first and second electromagnetic clutches 132 and 133. In this case, the steering input shaft 112 is connected to the steering output shaft 124 via the cable 131 in a power transmittable condition, whereby the steering wheel 111 is mechanically connected to the left and right front wheels FW1 and FW2. Meanwhile, if the above-described changeover control routine is not executed, after the time when erroneous connection anomalies arise in both the first and second electromagnetic clutches 132 and 133, the left and right front wheels FW1 and FW2 are turned in the turning characteristic indicated by a broken line in FIG. 5 in relation to the steering wheel steering angle θh. This turning characteristic differs from the turning characteristic of the steer-by-wire mode. In this state, because of the difference between the turning characteristic in the case where the left and right front wheels FW1 and FW2 are turned by means of the turning electric motor 122 and the turning characteristic in the case where the steering wheel 111 is mechanically connected to the left and right front wheels FW1 and FW2 via the cable 131, the steering wheel 111 is driven by means of the turning electric motor 122 irrespective of the drier's steering operation or contrary to the driver's intention. Therefore, when the driver steers the steering wheel 111, the driver is given an unnatural sensation such as self steer or steering wheel lock.

In contrast, through execution of the changeover control routine of the above-described step S167, after the time when an erroneous connection anomaly of one of the first and second electromagnetic clutches 132 and 133 is detected, the turning characteristic of the left and right front wheels FW1 and FW2 in relation to the turning operation imparted to the steering wheel 111 is gradually changed from the turning characteristic according to the first target turn angle δ1* for steer-by-wire to the turning. characteristic according to the second target turn angle δ2* for steer-by-mechanical connection. In addition, correction of the first target turn angle δ1* by the vehicle speed V is gradually changed. Accordingly, at the time when erroneous connection anomalies arise in both the first and second electromagnetic clutches 132 and 133, the turning characteristic of the left and right front wheels FW1 and FW2 has been switched from the turning characteristic of the steer-by-wire mode to the turning characteristic of the steer-by-mechanical connection mode. Since the turning characteristic of the left and right front wheels FW1 and FW2 in relation to the steering operation imparted to the steering wheel 111 does not change, the driver is not given an unnatural sensation. Further, since the turning characteristic is gradually changed, the driver is not given an unnatural sensation even when the turning characteristic is changed.

The steering apparatus of the present embodiment may be configured such that the value of the anomaly flag MBF representing anomaly of the first and second electromagnetic clutches 132 and 133, and the variables m and n used for gradually changing the turning characteristic of the left and right front wheels FW1 and FW2 are not stored when the ignition switched is turned off, and the operation of the electric control apparatus, including the ECUs 146 to 148, stops. Alternatively, the steering apparatus of the present embodiment may be configured to store and hold these values in a nonvolatile memory area as in the case of the steering failure flag STF upon detection of an anomaly of the first and second electromagnetic clutches 132 and 133. In the former case, every time the ignition switched is turned on, determination as to whether an anomaly has arisen in the first and second electromagnetic clutches 132 and 133 is performed, and the turning characteristic of the left and right front wheels FW1 and FW2 is gradually changed from the initial turning characteristic. In the later case, once any anomaly of the first and second electromagnetic clutches 132 and 133 is detected, after that point in time, the turning characteristic of the left and right front wheels FW1 and FW2 is gradually changed in a continuous manner.

As can be understood from the above description regarding the operation, in the second embodiment, when a failure arises in one of the first and second electromagnetic clutches 132 and 133, the turning characteristic of the left and right front wheels FW1 and FW2 is changed, or the traveling of the vehicle is restricted. Therefore, before an anomaly arises in each of the first and second electromagnetic clutches 132 and 133 and the stable steering of the vehicle becomes impossible, the motion of the vehicle is restricted, whereby the traveling stability of the vehicle is secured.

b1. Modification of Second Embodiment

In the second embodiment, the inspection program is performed only one time immediately after the ignition switch is turned on. However, the second embodiment may be modified in such a manner that the inspection ECU 146 executes the inspection program of FIG. 10 so as to inspect the first and second electromagnetic clutches 132 and 133 when the shift lever is shifted to the parking position, the driver operates the parking brake, or the vehicle speed V becomes zero. Further, the second embodiment may be modified in such a manner that the inspection of the first and second electromagnetic clutches 132 and 133 is performed upon satisfaction of combined conditions, selected from the present time being immediately after the ignition switch is turned on, the present time being immediately after the shift lever is shifted to the parking position, the present time being after operation of the parking brake is started, and the vehicle speed being zero.

In the second embodiment, on the basis of the rotational angle θm1 detected by means of the rotational angle sensor 143, rotations of the steering reaction electric motor 113, the steering wheel 111, and the steering input shaft 112 are detected, and on the basis of the rotational angle θm2 detected by means of the rotational angle sensor 144, rotations of the turning electric motor 122 and the steering output shaft 124, axial displacement of the rack bar 121, and turning of the left and right front wheels FW1 and FW2 are detected. However, instead of these rotational angles θm1 and θm2, the steering wheel steering angle θh and the actual turn angle δ, which are detected by means of the steering angel sensor 141 and the turn angel sensor 142, respectively, may be used.

In the second embodiment, the cable 131 is employed as an intermediate member for connecting the steering input shaft 112 and the steering output shaft 124 together, and the power transmission between the steering input shaft 112 and the steering output shaft 124 is realized by rotation (or torsion) of the cable 131. However, this configuration may be modified in such a manner that a conversion mechanism for converting rotational force about the axis of the steering input shaft 112 or the steering output shaft 124 to pulling force is provided at each of the connection ends of the steering input shaft 112 and the steering output shaft 124, and a cable capable of transmitting the pulling force between the conversion mechanisms is employed as an intermediate member. Alternatively, the configuration may be modified in such a manner that a rotation shaft capable of rotating coaxially with the steering input shaft 112 and the steering output shaft 124 is provided between the steering input shaft 112 and the steering output shaft 124, and the rotation shaft is employed as an intermediate member.

In the second embodiment, the steering reaction electric motor 113 is connected to the steering input shaft 112 so as to rotate the steering input shaft 112. However, the steering reaction electric motor 113 may be connected to the fixing member 131a or 131b of the cable (intermediate member) 131 so as to rotate the cable 131. In the case where a rotation shaft is used in place of the cable 131 as the intermediate member, the steering reaction electric motor 113 may be connected to the rotation shaft to rotate the shaft.

In this case, when the steering reaction electric motor 113, the turning electric motor 122, and their drive control systems are normal and the first and second electromagnetic clutches 132 and 133 are normal, the first electromagnetic clutch 132 is set to a connected state, and the second electromagnetic clutch 133 is set to a disconnected state, whereby steering reaction is imparted to the steering wheel 111 by the steering reaction electric motor 113, and the left and right front wheels FW1 and FW2 are turned by the turning electric motor 122. When the an erroneous connection anomaly arises in the second electromagnetic clutch 133, the steering reaction electric motor 113 is preferably switched to a mode for assisting the turning of the left and right front wheels FW1 and FW2, or stopped. The remaining controls are performed in the same manner as the above-described embodiment.

C. Modifications Common Between the First and Second Embodiments

In the first and second embodiments, the extent of change of the turning characteristic of the left and right front wheels FW1 and FW2 from the turning characteristic for steer-by-wire to that for steer-by-mechanical connection is increased with the number of times the steering wheel 11 or 111 has been steered over a predetermined angle or more. However, the extent of change of the turning characteristic may be increased with the time over which the steering wheel 11 or 111 has been steered over a predetermined angle or more. Specifically, in the first embodiment, the processing of steps S51 to S56 of the changeover control routines of FIGS. 4 and 7 is changed in such a manner that the value of the variable n increases with the cumulative time over which the steering wheel 11 has been steered over the predetermined angle or more. In the second embodiment, the processing of steps S171 to S176 of the changeover control routines of FIG. 13 is changed in such a manner that the value of the variable n increases with the cumulative time over which the steering wheel 111 has been steered over the predetermined angle or more. In these cases, the first and second embodiments may be modified in such a manner that the greater the steering angle of the steering wheel 11 or 111, the greater the increasing speed of the variable n, and thus, the greater the steering angle of the steering wheel 11 or 111, the higher the speed at which the turning characteristic is changed.

Further, the turning characteristic may be simply changed with elapse of time. Specifically, in the first embodiment, the processing of steps S51 to S56 is changed in such a manner that the value of the variable n increases with the cumulative time after the execution of the changeover control routine is started. In the second embodiment, the processing of steps S171 to S176 is changed in such a manner that the value of the variable n increases with the cumulative time after the execution of the changeover control routine is started.

Further, the turning characteristic may be gradually changed with the number of times the ignition switch is turned on. Specifically, in the first embodiment, the processing of steps S51 to S56 is changed to increase the variable n every time the ignition switch is turned on, or the ignition switch is turned on a predetermined number of times, after the execution of the changeover control routine is started. In the second embodiment, the processing of steps S171 to S176 is changed to increase the variable n every time the ignition switch is turned on, or the ignition switch is turned on a predetermined number of times, after the execution of the changeover control routine is started.

Next, there will be described modifications of the first and second embodiments in which the turning characteristic of the left and right front wheels FW1 and FW2 is changed upon satisfaction of the condition that the left and right front wheels FW1 and FW2 have the same turn angel δ before and after the turning characteristic is changed. First, this modification will be described on the basis of the second embodiment. In this modification, the turning ECU 148 executes a changeover control routine of FIG. 15 instead of the changeover control routine of FIG. 13. The remaining portions are the same as those of the second embodiment.

Figure 15:
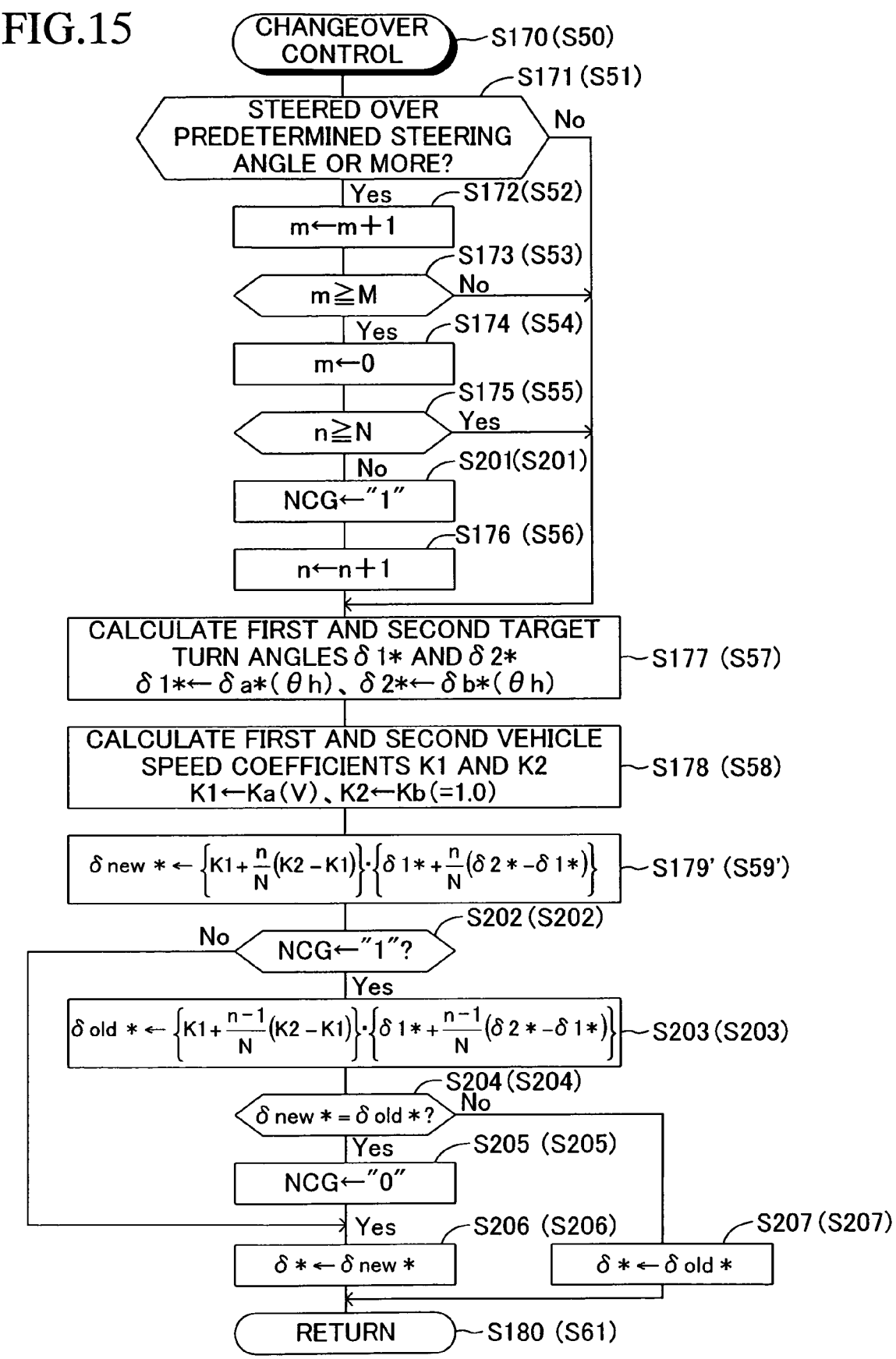
FIG. 15 is a flowchart showing a changeover control routine according to a modification of the first and second embodiments.

In the changeover control routine of FIG. 15, the processing of step S201 for setting a change prohibiting flag NCG to "1" is added between steps S175 and S176 of FIG. 13. The change prohibiting flag NCG represents that changing of the turning characteristic of the left and right front wheels FW1 and FW2 is prohibited when the value is "1," and represents that changing of the turning characteristic of the left and right front wheels FW1 and FW2 is permitted when the value is "0." The change prohibiting flag NCG is initially set to "0." The processing of this step S201 is adapted to temporality prohibit the turning characteristic from being changed, even at the timing for changing the turning characteristic of the left and right front wheels FW1 and FW2 designated by the processing of steps S171 to S176, unless conditions to be described later are satisfied.

Further, in the changeover control routine of FIG. 15, the processing of step S179' corresponds to that of step S179 of FIG. 13 but is partially modified; and the processing of steps S202 to S207 is added. In step S179', the target turn angle calculated in accordance with the above-described Eq. 2 is stored as a new target turn angle δnew*. In step S202, determination is made as to whether the value of the change prohibiting flag NCG is "1." When the value of the change prohibiting flag NCG is "0" and it represents that changing of the turning characteristic of the left and right front wheels FW1 and FW2 is permitted, the turning ECU 148 makes a "No" determination in step S202, and proceeds to step S206. In step S206, the final target turn angle δ* is set to the new target turn angle δnew*, and in step S180, the execution of the changeover control routine is ended. Accordingly, in this case, the steering apparatus operates in the same manner as in the above-described embodiment.

When the value of the change prohibiting flag NCG is "1" and it represents that changing of the turning characteristic of the left and right front wheels FW1 and FW2 is prohibited, the turning ECU 148 makes a "Yes" determination in step S202, and proceeds to step S203. In step S203, the turning ECU 148 calculates an old target turn angle δold* through performance of calculation in accordance with the following Eq. 4.

$$\delta\text{old}^* = \{K1 + (n-1)\cdot(K2-K1)/N\}\cdot\{\delta1^* + (n-1)\cdot(\delta2^* - \delta1^*)/N\} \qquad \text{Eq. 4}$$

In Eq. 4, the value (n−1) is a variable value which determines the turning characteristic of the left and right front wheels FW1 and FW2 immediately before the variable n is changed by the processing of the above-mentioned step S176. Therefore, the old target turn angle δold* calculated in step S203 in accordance with Eq. 4 represents the target turn angle δ* according to the turning characteristic immediately before it is changed.

In step S204, the turning ECU 148 determines whether the new target turn angle δnew* is equal to the old target turn angle δold*. When the new target turn angle δnew* is not equal to the old target turn angle δold*, the turning ECU 148 makes a "No" determination in step S204, and set the final target turn angle δ* to the old target turn angle δold*. Accordingly, in this case, even when the variable n is changed by the processing of the above-described step S176, the final target turn angle δ* (=δold*) is determined in accordance with the turning characteristic immediately before it is changed.

Meanwhile, when the new target turn angle δnew* becomes equal to the old target turn angle δold*, the turning ECU 148 makes a "Yes" determination in step S204, and returns the value of the change prohibiting flag NCG to "0" in step S205. Subsequently, by the processing of the above-described step S206, the turning ECU 148 sets the final target turn angle δ* to the new target turn angle δnew*. After that, until the variable n is again changed by the processing of step S176, the turning ECU 148 makes a "No" determination in the above-described step S202, and performs the processing of step S206. Accordingly, the final target turn angle δ* is set to the new target turn angle δnew*.

By virtue of the processing of the added steps S201 to S207, the turning characteristic is not changed until the new target turn angle δnew* according to the changed turning characteristic becomes equal to the old target turn angle δold* according to the turning characteristic before being changed. The turning characteristic is then changed when the new target turn angle δnew* becomes equal to the old target turn angle δold*. Therefore, according to the present modification, the turning characteristic of the left and right front wheels FW1 and FW2 is prevented from being abruptly changed irrespectively of the driver's steering operation applied to the steering wheel 111, whereby the driver is not given an unnatural sensation while he steers the steering wheel 111. In particular, even when the turning characteristic is changed to a large extent, the driver is not given an excessive unnatural sensation.

When the present modification is applied to the first embodiment, the processing of steps S50 to S61 of FIG. 7 is changed as follows. That is, as indicted in FIG. 15 by use of parentheses, the processing of step S201 is added between steps S55 and S56, step S59 is changed to step S59', and steps S202 to S207 are added between step S59' and step S60. By virtue of this, the steering apparatus according to this modification operates in the same manner as in the second embodiment. However, this modification of the first embodiment differs from the modification of the second embodiment in that, in FIG. 15, the processing of step S60 of FIG. 7 is performed after the processing of step S206 and S207.

The changeover control routine of FIG. 15 may be simplified to a changeover control routine of FIG. 16. Notably, in FIG. 16, unparenthesized step numbers represent a modification of the second embodiment, and parenthesized step numbers represent a modification of the first embodiment. In the changeover control routine of FIG. 16, the processing of the above-described steps S179' (S59') and S202 to S207 of FIG. 15 is changed to the processing of steps S211 to S215. That is, by the processing of step S211 similar to the above-described step S202, determination is made as to whether the value of the change prohibiting flag NCG is "1." When the value of the change prohibiting flag NCG is "0" and it represents that changing of the turning characteristic of the left and right front wheels FW1 and FW2 is permitted, in step S214, the final target turn angle δ* is calculated in accordance with Eq. 2 as in the case of the processing of the above-described step S179'.

When the value of the change prohibiting flag NCG is "1" and it represents that changing of the turning characteristic of the left and right front wheels FW1 and FW2 is prohibited, in step S212, determination is made as to whether the steering wheel steering angle θh is zero. When the steering wheel steering angle θh is zero, the turning ECU 148 makes a "Yes" determination in step S212, sets the change prohibiting flag NCG to "0," and executes the processing of the above-described step S214. Meanwhile, when the steering wheel steering angle θh is not zero, the turning ECU 148 makes a "No" determination in step S212, and then proceeds to step S215 so as to calculate the final target turn angle δ* in accordance with Eq. 4 as in the case of the processing of the above-described step S203.

That is, even when the variable n used to change the turning characteristic of the left and right front wheels FW1 and FW2 is changed by the processing of step S176 (S56), the turning characteristic of the left and right front wheels FW1 and FW2 is not changed until the steering wheel steering angle θh becomes zero. Subsequently, the turning characteristic of the left and right front wheels FW1 and FW2 is changed when the steering wheel steering angle θh becomes zero. The above operation is based on the fact that when the steering wheel steering angle θh is zero, the first and second target turn angles δ1* and δ2* calculated by the processing of step S177 (S57) are both zero, and the results of calculations performed in accordance with Eqs. 2 and 4, respectively, inevitably become zero. In other words, when the steering wheel 111 or 11 is not steered and the steering wheel steering angle θh is zero, the target turn angle δ* calculated by the processing of step S214 and that calculated by the processing of step S215 both become zero independently of the variable n; i.e., the turning characteristic of the left and right front wheels FW1 and FW2. Notably, in this case as well, when the present modification is applied to the first embodiment, the processing of step S60 of FIG. 7 must be executed after the processing of steps S214 and S215 in FIG. 16.

Accordingly, although being limited to the case where the steering wheel steering angle θh is zero, the turning characteristic is first changed when the target turn angle δ* after being changed becomes equal to the target turn angle δ* before being changed. Therefore, according to the present modification, the turning characteristic of the left and right front wheels FW1 and FW2 is prevented from being abruptly changed irrespectively of the driver's steering operation applied to the steering wheel 111 or 11, whereby the driver is not given an unnatural sensation while he steers the steering wheel 111 or 11. Moreover, as described above, no problem occurs even when the turning characteristic is changed to a large extent.

In the first and second embodiments, the steering wheels 111 and 11 are configured to be turned. However, the present invention can be applied to a steering apparatus for a vehicle in which, in place of the steering wheels 111 and 11, a linearly moved steering member such as a joystick is employed so as to turn the left and right front wheels FW1 and FW2.

The present invention is not limited to the above-described first and second embodiments and modifications thereof, and various other modifications may be employed without departing from the scope of the present invention.

What is claimed is:

1. A steering apparatus for a vehicle, comprising:
   a steering transmission mechanism mechanically connecting a steering member to a steerable wheel of the vehicle, the steering transmission mechanism mechanically transmitting to the steerable wheel steering operation applied to the steering member, to thereby turn the steerable wheel in accordance with a predetermined first characteristic in relation to the steering operation applied to the steering member;
   a connection-disconnection device interposed in the steering transmission mechanism, the connection-disconnection device mechanically connecting the steering member to the steerable wheel when the connection-disconnection apparatus is in a connected state and breaking the mechanical connection when the connection-disconnection apparatus is in a disconnected state;
   a turning actuator device, including first and second turning actuators operating jointly with each other, disposed in the steering transmission mechanism located between the connection-disconnection device and the steerable wheel, the turning actuator device turning the steerable wheel when the connection-disconnection apparatus is in a disconnected state;
   turning control means for controlling operation of the turning actuator device in accordance with the steering operation applied to the steering member so as to turn the steerable wheel in accordance with a predetermined second characteristic in relation to the steering operation applied to the steering member, the second characteristic differing from the first characteristic;
   failure detection means for detecting an anomaly of the connection-disconnection device or the first and second turning actuators; and
   turning characteristic changeover control means for controlling operation of one of the first and second turning actuators to gradually change the turning characteristic of the steerable wheel in relation to the steering operation applied to the steering member from the second characteristic to the first characteristic when the failure detection means detects an anomaly of the connection-disconnection device or in the other of the first and second turning actuators.

2. A steering apparatus for a vehicle according to claim 1, wherein
   the connection-disconnection device includes first and second connection-disconnection units connected in series and each being selectively switched to a disconnected state or a connected state;
   the failure detection means detects an anomaly of the first and second connection-disconnection units; and
   the turning characteristic changeover control means controlling operation of the turning actuator device such that the turning characteristic of the steerable wheel in relation to the steering operation applied to the steering member gradually changes from the second characteristic to the first characteristic when the failure detection means detects an anomaly in which one of the first and second connection-disconnection units is in an always-connected state.

3. A steering apparatus for a vehicle according to claim 2 further comprising travel restriction control means for restricting travel speed of the vehicle or disabling the vehicle from traveling when the failure detection means detects an anomaly in which one of the connection-disconnection units is in an always-connected state.

4. A steering apparatus for a vehicle according to claim 1, wherein the turning characteristic changeover control means gradually changes the turning characteristic of the steerable wheel in relation to the steering operation applied to the steering member with the steering operation applied to the steering member.

5. A steering apparatus for a vehicle according to claim 4, wherein the turning characteristic changeover control means increases the rate of change in the turning characteristic of the steerable wheel in relation to the steering operation applied to the steering member with the number of times the steering member is operated to a predetermined extent or more.

6. A steering apparatus for a vehicle according to claim 5, wherein the turning characteristic changeover control means increases the rate of change in the turning characteristic of the steerable wheel in relation to the steering operation applied to the steering member with the extent to which the steering member is operated.

7. A steering apparatus for a vehicle according to claim 4, wherein the turning characteristic changeover control means increases the rate of change in the turning characteristic of the steerable wheel in relation to the steering operation applied to the steering member with the time over which the steering member is operated to a predetermined extent or more.

8. A steering apparatus for a vehicle according to claim 7, wherein the turning characteristic changeover control means increases the rate of change in the turning characteristic of the steerable wheel in relation to the steering operation applied to the steering member with the extent to which the steering member is operated.

9. A steering apparatus for a vehicle according to claim 1, wherein the turning characteristic changeover control means gradually changes the turning characteristic of the steerable wheel in relation to the steering operation applied to the steering member with an elapse of time.

10. A steering apparatus for a vehicle according to claim 1, wherein the turning characteristic changeover control means gradually changes the rate of change in the turning characteristic of the steerable wheel in relation to the steering operation applied to the steering member with the number of times an ignition switch is turned on.

11. A steering apparatus for a vehicle according to claim 10, wherein the turning characteristic changeover control means changes the turning characteristic of the steerable wheel in relation to the steering operation applied to the steering member every time the ignition switch is turned on.

12. A steering apparatus for a vehicle according to claim 10, wherein the turning characteristic changeover control means changes the turning characteristic of the steerable wheel in relation to the steering operation applied to the steering member every time the ignition switch is turned on a predetermined number of times.

13. A steering apparatus for a vehicle according to claim 1, wherein the turning characteristic changeover control means changes the turning characteristic of the steerable wheel upon satisfaction of a condition that the steerable wheel has an identical turn angle before and after the turning characteristic is changed.

14. A steering apparatus for a vehicle according to claim 1, wherein the turning characteristic changeover control means changes the turning characteristic of the steerable wheel upon satisfaction of a condition that the steering member is not operated.

15. A steering apparatus for a vehicle according to claim 1, further comprising connection control means for bringing the connection-disconnection device into a connected state after control of the other of the first and second turning actuators is effected by the turning characteristic changeover control means.

16. A steering apparatus for a vehicle according to claim 15, further comprising assist control means for controlling operation of the other of the first and second turning actuators so as to assist turning of the steerable wheel in accordance with the steering operation applied to the steering member after the connection-disconnection device is brought into a connected state by means of the connection control means.

17. A steering apparatus for a vehicle according to claim 1, further comprising a reaction actuator disposed in the steering transmission mechanism located between the steering member and the connection-disconnection device and applying reaction force to the steering member when the connection-disconnection device is in a disconnected state; and reaction imparting control means for controlling operation of the reaction actuator in accordance with the steering operation, which is applied to the steering member, so as to impart a reaction force to the steering operation applied to the steering member.

* * * * *